(12) United States Patent
McKee et al.

(10) Patent No.: US 8,993,945 B2
(45) Date of Patent: Mar. 31, 2015

(54) OVEN CIRCULATING HEATED AIR

(75) Inventors: Philip R. McKee, Frisco, TX (US);
Scott S. Smith, Richardson, TX (US);
Lee T. Vanlanen, McKinney, TX (US);
Earl R. Winkelmann, Garland, TX (US)

(73) Assignee: Appliance Scientific, Inc., Dallas, TX (US)

( * ) Notice: Subject to any disclaimer, the term of this patent is extended or adjusted under 35 U.S.C. 154(b) by 841 days.

(21) Appl. No.: 13/101,073

(22) Filed: May 4, 2011

(65) Prior Publication Data

US 2011/0276184 A1  Nov. 10, 2011

Related U.S. Application Data

(60) Provisional application No. 61/331,299, filed on May 4, 2010.

(51) Int. Cl.
*H05B 6/64* (2006.01)
*H05B 6/80* (2006.01)
*H05B 6/70* (2006.01)
*G05D 23/20* (2006.01)

(52) U.S. Cl.
CPC .......... *G05D 23/2023* (2013.01); *H05B 6/6485* (2013.01)
USPC ............ 219/756; 219/681; 219/725; 219/690

(58) Field of Classification Search
CPC .......... H05B 6/6473; H05B 6/80; H05B 6/68; H05B 6/6485; G05D 23/2023
USPC ......... 219/756, 757, 758, 678, 679, 680, 681, 219/682, 683, 684, 685, 686, 725, 726, 727, 219/728, 729, 730
See application file for complete search history.

(56) References Cited

U.S. PATENT DOCUMENTS

| | | | |
|---|---|---|---|
| 2,617,966 A | 11/1952 | Kilgore | 315/39 |
| 2,898,438 A | 8/1959 | Gibson | |
| 3,397,817 A | 8/1968 | Smith | 221/150 |
| 3,767,883 A | 10/1973 | Staats | 219/10.55 |
| 3,867,605 A * | 2/1975 | Yee | 219/751 |
| 3,884,213 A | 5/1975 | Smith | 126/21 A |
| 4,121,179 A | 10/1978 | Chinone et al. | |

(Continued)

OTHER PUBLICATIONS

International Search Report and Written Opinion mailed Aug. 12, 2011 in the related PCT/US11/035624.

(Continued)

*Primary Examiner* — Dana Ross
*Assistant Examiner* — Gyounghyun Bae
(74) *Attorney, Agent, or Firm* — Ohlandt, Greeley, Ruggiero & Perle, L.L.P.

(57) ABSTRACT

An oven which runs on a 20 ampere single phase electrical service includes a cooking chamber comprising a top wall, a bottom wall, a first side wall and a second side wall, at least one microwave generator, at least one set of nozzles, tubes or apertures disposed above a food product disposed within the oven, at least one blower having an RPM in the range between about 3000 to about 4000 at 100 percent velocity, wherein the blower circulates at least a portion of gas from the nozzles, tubes or apertures into the cooking chamber substantially toward the food product and back to the nozzles, tubes or apertures, and a thermal energy source that heats the gas, wherein the heated gas at or near the food product disposed in the cooking chamber exhibits a flow rate of at least about 150 CFM.

25 Claims, 13 Drawing Sheets

(56) References Cited

U.S. PATENT DOCUMENTS

| | | | |
|---|---|---|---|
| 4,332,992 A | 6/1982 | Larsen | 219/999.999 |
| 4,335,290 A | 6/1982 | Teich | 219/999.999 |
| 4,523,391 A | 6/1985 | Smith et al. | 34/225 |
| 4,876,426 A | 10/1989 | Smith | 219/999.999 |
| 5,122,633 A | 6/1992 | Moshammer et al. | 219/687 |
| 5,128,158 A | 7/1992 | Chartrain et al. | 426/233 |
| 5,166,487 A | 11/1992 | Hurley et al. | 219/10.55 |
| 5,254,823 A | 10/1993 | McKee et al. | 219/10.55 |
| 5,272,299 A | 12/1993 | Ovadia | 219/999.999 |
| 5,290,575 A | 3/1994 | Torikata | 426/233 |
| 5,401,940 A | 3/1995 | Smith et al. | 219/679 |
| 5,416,304 A | 5/1995 | De La Cruz et al. | 219/730 |
| 5,434,390 A | 7/1995 | McKee et al. | 219/681 |
| 5,483,044 A * | 1/1996 | Thorneywork et al. | 219/681 |
| 5,556,566 A | 9/1996 | Cappello et al. | 219/683 |
| 5,558,793 A | 9/1996 | McKee et al. | 219/391 |
| 5,600,310 A | 2/1997 | Whipple et al. | |
| 5,676,870 A * | 10/1997 | Wassman et al. | 219/400 |
| 5,683,240 A | 11/1997 | Smith et al. | 432/59 |
| 5,816,234 A | 10/1998 | Vasan | 126/21 A |
| 5,818,014 A | 10/1998 | Smith et al. | 432/59 |
| 5,897,807 A | 4/1999 | Edgar et al. | 219/700 |
| 5,927,265 A | 7/1999 | McKee et al. | 126/21 A |
| 5,928,541 A | 7/1999 | Tsukamoto et al. | 219/400 |
| 5,958,274 A | 9/1999 | Dobie et al. | 219/681 |
| 5,990,466 A | 11/1999 | Mckee et al. | 219/746 |
| 6,008,483 A | 12/1999 | McKee et al. | 219/746 |
| 6,054,695 A | 4/2000 | Lautenschlager | 219/687 |
| 6,060,701 A | 5/2000 | McKee et al. | 219/681 |
| 6,140,626 A | 10/2000 | McKee et al. | 219/681 |
| 6,242,725 B1 | 6/2001 | Murata et al. | |
| 6,262,406 B1 | 7/2001 | McKee et al. | 219/681 |
| 6,281,484 B2 | 8/2001 | Thomas | 219/679 |
| 6,307,190 B1 | 10/2001 | Thomas | 219/679 |
| 6,392,211 B2 | 5/2002 | Kim et al. | 219/681 |
| 6,403,937 B1 * | 6/2002 | Day et al. | 219/681 |
| 6,462,319 B1 * | 10/2002 | Uy et al. | 219/681 |
| 6,486,453 B1 | 11/2002 | Bales et al. | 219/702 |
| 6,534,754 B2 | 3/2003 | Schulz et al. | 219/679 |
| 6,568,215 B2 | 5/2003 | Schofield et al. | 65/33.2 |
| 6,573,479 B2 * | 6/2003 | Arntz et al. | 219/400 |
| 6,670,586 B2 | 12/2003 | Ingemanson et al. | |
| 6,716,467 B2 | 4/2004 | Cole et al. | 426/466 |
| 6,768,087 B2 | 7/2004 | Kikuchi | 219/680 |
| 6,805,112 B2 | 10/2004 | Cole et al. | 126/21 A |
| 6,874,495 B2 | 4/2005 | McFadden | 126/210 |
| 6,927,371 B1 | 8/2005 | Hargett et al. | 219/679 |
| 7,055,518 B2 | 6/2006 | McFadden et al. | 126/21 A |
| 7,087,872 B1 | 8/2006 | Dobie et al. | 219/681 |
| 7,109,447 B2 | 9/2006 | Goranson | 219/501 |
| 7,360,533 B2 * | 4/2008 | McFadden | 126/21 A |
| 7,435,931 B1 * | 10/2008 | McKee et al. | 219/683 |
| 7,468,495 B2 * | 12/2008 | Carbone et al. | 219/400 |
| 8,759,731 B2 * | 6/2014 | McKee et al. | 219/756 |
| 2003/0038131 A1 | 2/2003 | Nomura et al. | 219/735 |
| 2004/0216732 A1 * | 11/2004 | McFadden | 126/21 A |
| 2005/0205566 A1 | 9/2005 | Kassayan | 219/725 |
| 2005/0236388 A1 * | 10/2005 | Goranson | 219/400 |
| 2006/0157479 A1 * | 7/2006 | Claesson et al. | 219/681 |
| 2006/0191918 A1 | 8/2006 | Ashford et al. | 219/746 |
| 2007/0137633 A1 | 6/2007 | McFadden et al. | 126/21 A |
| 2007/0278218 A1 * | 12/2007 | Claesson et al. | 219/681 |
| 2008/0185378 A1 * | 8/2008 | Beausse | 219/757 |
| 2008/0283519 A1 * | 11/2008 | McKee et al. | 219/680 |
| 2008/0289514 A1 * | 11/2008 | Speranza | 99/468 |
| 2009/0218336 A1 * | 9/2009 | McKee et al. | 219/680 |
| 2009/0236331 A1 * | 9/2009 | McKee et al. | 219/681 |
| 2009/0285945 A1 * | 11/2009 | Michael | 426/95 |
| 2012/0111857 A1 * | 5/2012 | McKee et al. | 219/756 |

OTHER PUBLICATIONS

Form PCT/ISA 206 "Invitation to Pay Additional Fees and Where Applicable, Protest Fee" mailed Aug. 18, 2011 in the corresponding PCT/US11/035242.
International Search Report mailed Jun. 27, 2008 in PCT/US08/55518.
International Search Report mailed Nov. 23, 2008 in PCT/US08/06246.
International Search Report mailed Jul. 7, 2009 in PCT/US09/43792.
International Search Report mailed Jul. 9, 2009 in PCT/US09/43812.
International Search Report mailed Jul. 29, 2009 in PCT/US09/43782.
International Search Report mailed Oct. 26, 2009 in PCT/US09/43804.
International Search Report mailed Jun. 18, 2010 in PCT/US10/31299.
International Preliminary Report on Patentability (IPRP) dated Apr. 9, 2012 for PCT application No. PCT/US2011/035242.

* cited by examiner

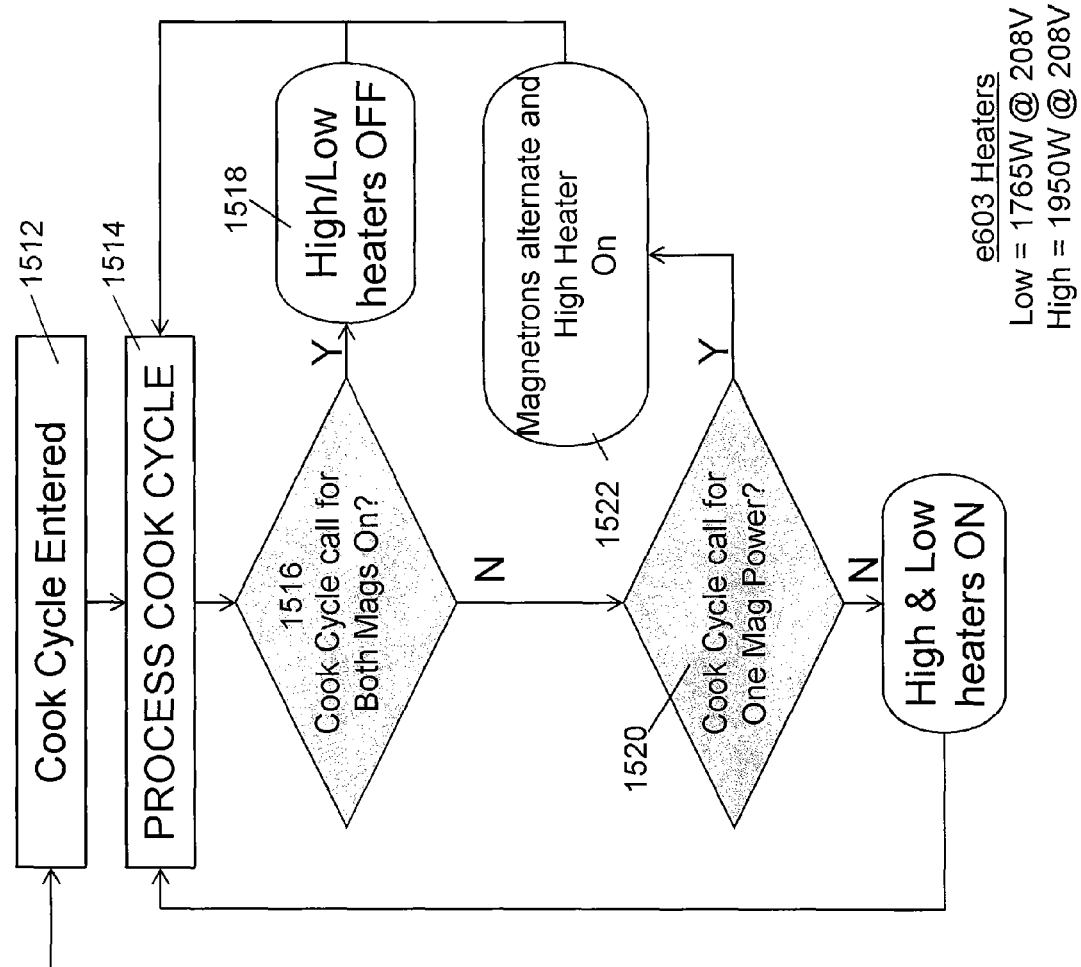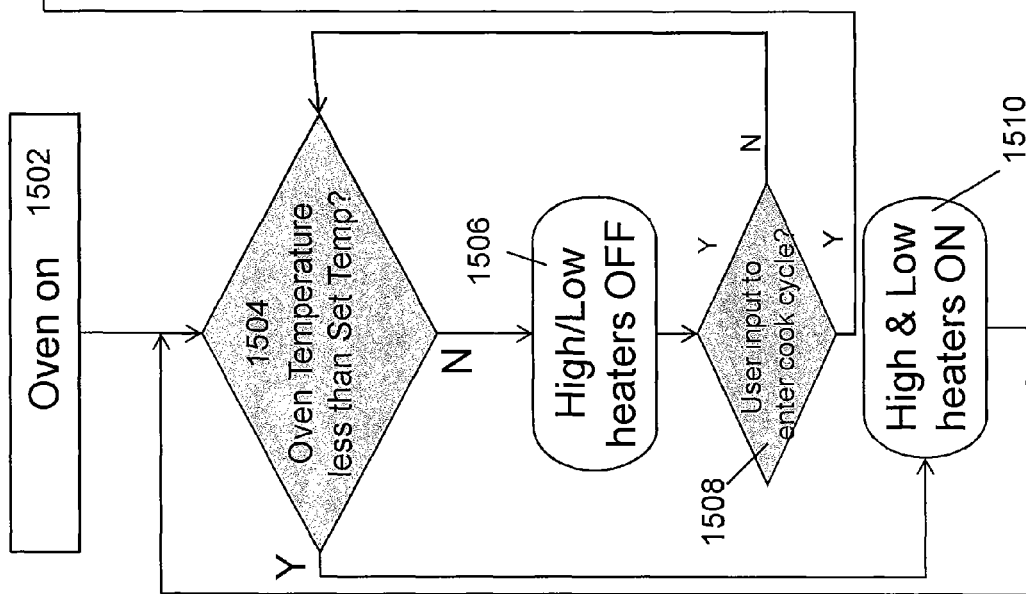

OVEN CIRCULATING HEATED AIR

CROSS REFERENCE TO RELATED PATENT APPLICATIONS

This application claims the benefit of U.S. Provisional Application No. 61/331,299, filed May 4, 2010. The contents of U.S. Provisional Application No. 61/331,299, filed May 4, 2010, are hereby incorporated herein by reference in their entirety.

BACKGROUND

1. Field of the Disclosure

The present disclosure relates generally to ovens circulating heated air. More particularly, the present disclosure relates to an oven that runs on a 208 volt 20 ampere or 240 volt 20 ampere single phase electric service.

2. Description of Related Art

Hot air impingement and microwave radiation are two different ways to heat and cook a food product. Hot air impingement is based on the transfer of heat from hot air having a higher temperature to an object having a lower temperature, changing the internal energy of the air and the object in accordance with the first law of thermodynamics. On the other hand, microwave radiation consists of electromagnetic waves having a typical wavelength of 12.24 cm or 4.82 inches and a frequency of 2,450 MHz, which are capable of causing dielectric heating of water, fat and sugar molecules in a food product.

Initially, microwave ovens and ovens based on hot air impingement were separately developed and commercialized. However, it was later demonstrated that a combination of hot air impingement and microwave radiation used in an oven can facilitate high-speed, high-quality cooking. This led to the development and commercialization of quick-cooking hybrid ovens based on both hot air impingement and microwave radiation and has established a new standard in the high-speed cooking technology sector.

While the technology of combining hot air impingement and microwave heating to achieve high-speed cooking in an oven has by now been well established, the current technology does not address a host of new challenges created by such combination, including the problem of inefficient energy use and consequent suboptimal cooking efficiency in the existing high-speed ovens. The fundamental principle of ovens involves conversion of an available power (e.g., electric power) into heat energy to be directed to and absorbed by a food product in the oven to raise its internal temperature. Accordingly, the optimal cooking efficiency of an oven requires that the amount of heat energy converted from a given power supply be maximized; the amount of the heat energy directed to a food product in the oven be maximized; and the amount of the heat energy absorbed and retained by the food product be maximized. However, the current technology of the high-speed ovens using both hot air impingement and microwave radiation is not directed to achieving such optimal cooking efficiency.

As a food product resides in a hot air environment of an oven, temperature gradients, or several boundary layers, form around the cooler food product. The oven cooks the food product by transferring the heat energy to the food product through these temperature gradients. Forced air convection by, for example, a blower can improve the heat transfer by "wiping away" the temperature gradients around the food product and bringing the higher temperature air closer to the food product. Hot air impingement can further improve the heat transfer by "piercing" the temperature gradients with jets of hot air and bringing the air at higher temperature closer to the surface of the food product. However, significant portions of the electric power and the heat energy from the hot air impingement are lost in the process to the oven walls, various openings, plenums and air blower walls that form the hot air circulation and delivery system of the oven.

Typical construction of a combination microwave and hot air impingement oven capable of cooking a 14 inch pizza might have about 27-33 air inlet holes at the top of the cook cavity, each of about 0.3 inch to 0.5 inch diameter, resulting in a total open surface area of about 4 square inches through which the air leading into the oven cavity passes. It is the passage of the heated air through these relatively small holes at high velocity that results in the hot air jets characteristic of hot air impingement.

Another well-known problem with the technique of hot air impingement is "spotting" in the areas directly impacted by the hot air jets, causing uneven heating or scorching of the surface of the food product. While this problem may be resolved by, for example, reduction in the hot air velocity and/or increase in the diameter of the columns of impinging hot air, such solutions may further reduce the efficiency of the hot air impingement.

In addition, the diameter/cross-sectional area of a column of hot air impingement generally increases as the distance from the hot air jet orifice increases, thereby reducing the efficiency of hot air impingement. While this problem may be solved by increasing the hot air velocity, as discussed above, such solution may further aggravate the spotting problem.

A still further undesirable aspect of conventional ovens using hot air impingement is noise generated by the air impingement. Heated air is forced through openings at a high air velocity and strikes the product that is heated at a high velocity. After striking the product that is heated at a high velocity, the air is drawn out of the oven cavity. The airflow of the air impingement oven causes undesirably high noise levels.

Conventional ovens using infrared elements located inside the oven cavity, such infrared elements typically being located below the product being heated, can collect grease and other particles on a surface below the infrared element. Due to a combination of the close proximity of the infrared element to the grease and the high temperature of the infrared element, the grease and other particles below the infrared element can generate flames that may cause injury to a user or burning of the product being cooked.

In summary, the problem with the current high-speed cooking technology based on a combination of hot air impingement and microwave radiation is that the combination has never been done in a way to optimize the cooking efficiency of the oven. With the suboptimal cooking efficiency in the presence of various sources of inefficiencies in the conversion of electrical power to heat, the currently available high-speed ovens (either commercial models or residential models) require a relatively high level of electric power to operate.

Consumers of food prepared by high-speed ovens have established standards of cook quality, for example, of food texture and temperature, which are necessary for consumers to readily purchase and consume the food products. A service window has also been established in certain sectors of the foodservice industry, or example, fast food, such that food prepared in high-speed ovens must be delivered in a predetermined time period, for example, about 2 minutes, in order to satisfy the customer's service expectations. For example, a 14 inch pizza cooked in over 5 minutes is outside of an acceptable service window for many fast food locations. In addition, during busy times such as breakfast, lunch and dinner, high-speed ovens must be able to cook food items one after another to the same quality standards and in the same service times without requiring a resting period for the oven's operating temperature to recover. Accordingly, high-speed ovens must repeatedly achieve the desirable cook quality within the acceptable service window for a variety of food products, such as, wraps, pizzas and the like. Currently available high-speed ovens require a 208 volt 30 ampere or 240 volt 30 ampere electric service to repeatedly achieve the desirable cook quality of many food items, such as a 14 inch pizza, within the acceptable service window. Reduction of consumption of electric power in currently available high-speed ovens to a 208 volt 20 ampere or 240 volt 20 ampere electric service typically requires either an extension of the cook times beyond the established service window or a recovery period between repetitive cooks, so that the currently available high-speed ovens cannot repeatedly provide the food product within the service window established within the high-speed oven industry for many food items on such reduced electrical supplies.

Accordingly, it has been determined by the present disclosure that there is a need for an oven circulating an airflow of heated air that runs on a 208 volt 20 ampere or 240 volt 20 ampere single phase electric service. It has also been determined by the present disclosure that there is a need for an oven circulating an airflow of heated air having noise levels that are reduced relative to impingement ovens. It has additionally been determined by the present disclosure that there is a need for an oven having an infrared element that reduces flames generated thereby.

SUMMARY

An oven which runs on a single phase 20 ampere electrical service at either 240 Volts or 208 Volts includes a cooking chamber comprising a top wall, a bottom wall, a first side wall and a second side wall, at least one microwave generator, at least one set of nozzles, tubes or apertures disposed above a food product disposed within the oven, at least one blower having a revolutions per minute ("RPM") in the range between about 3000 to about 4000 at 100 percent velocity, wherein the blower circulates at least a portion of gas from the nozzles, tubes or apertures into the cooking chamber substantially toward the food product and back to the nozzles, tubes or apertures, and a thermal energy source that heats the gas, wherein the heated gas at or near the food product disposed in the cooking chamber exhibits a flow rate of at least about 150 cubic feet per minute ("CFM"), and, preferably, for example, in an oven cooking a 14 inch pizza, at least equal to 200 CFM, more preferably, about 250 CFM to 350 CFM.

An oven which runs on a 20 ampere single phase electrical service, the oven comprising: a cooking chamber comprising a top wall, a bottom wall, a first side wall and a second side wall; at least one microwave generator; at least one set of nozzles, tubes or apertures disposed above a food product disposed within the oven; at least one blower, wherein the blower circulates at least a portion of gas from the nozzles, tubes or apertures into the cooking chamber substantially toward the food product and back to the nozzles, tubes or apertures; a thermal energy source that heats the gas; at least one temperature sensor disposed within the cooking chamber; and a controller that at least partially activates or deactivates the microwave generator, the blower, and/or the thermal energy source such that the oven does not draw in excess of about 20 Amperes.

A controller which controls the operation of an oven having at least one microwave generator, at least one blower and at least one thermal energy source, the controller comprising: a microprocessor which is electrically connected to each of the microwave generator, blower and thermal energy source, wherein the microprocessor is capable of at least partially activating or deactivating the a microwave generator, the blower, and/or the thermal energy source such that the oven does not draw in excess of about 20 Amperes during operation.

A controller which controls the operation of an oven such that the oven does not draw in excess of about 20 Amperes of single phase electrical service during operation, the controller comprising: a microprocessor; a memory in communication with the microprocessor; a first input/output connection in communication with a temperature sensor; a second input/output connection in communication with a first heating element; a third input/output connection in communication with a second heating element; a fourth input/output connection in communication with a first magnetron; and a fifth input/output connection in communication with a second magnetron; wherein the controller activates and/or deactivates the first heating element, second heating element, first magnetron and second magnetron independently of one another and pursuant to a cook cycle program stored in the memory and executed by the microprocessor.

The first heating element is a low heating element and the second heating element is a high heating element.

A non-transitory storage medium for controlling the operation of an oven such that the oven does not draw in excess of about 20 Amperes of single phase electrical service during operation, the storage medium comprising instructions that are readable by a processor and cause the processor to:
  (a) determine if the oven has a temperature less than a predetermined temperature;
    (i) if the temperature is less than the predetermined temperature, activate at least one thermal heating source and return to step (a);
    (ii) if the temperature is equal to or great than the predetermined temperature, deactivate the thermal heating source;
  (b) determine if a user has entered a cook cycle;
    (i) if the user has not entered a cook cycle, then return to step (a);
    (ii) if the user has entered a cook cycle, then execute the cook cycle;
  (c) determining if the cook cycle calls for activation of a first magnetron and a second magnetron:
    (i) if the cook cycle calls for the activation of the first and second magnetrons, then deactivate the thermal heating source and then return to step (b)(ii);
    (ii) if the cook cycle does not call for activation of the first and second magnetrons proceed to step (d) below:
  (d) determine if the cook cycle calls for activation of only one magnetron;
    (i) if the cook cycle calls for activation of only one magnetron, then alternate the activation of the first magnetron and the second magnetron, such that only one of the first and second magnetrons is activated at a time, and activate the thermal heating source, and thereafter return to the step (b)(ii); and
    (ii) if the cook cycle does not call for activation of only one magnetron, then activate the thermal heating source and return to step (b)(ii).

A method for controlling the operation of an oven such that the oven does not draw in excess of about 20 Amperes of single phase electrical service during operation, the method comprising:

(a) determining if the oven has a temperature less than a predetermined temperature;
  (i) if the temperature is less than the predetermined temperature, activating at least one thermal heating source and return to step (a);
  (ii) if the temperature is equal to or great than the predetermined temperature, deactivating the thermal heating source;
(b) determining if a user has entered a cook cycle;
  (i) if the user has not entered a cook cycle, then return to step (a);
  (ii) if the user has entered a cook cycle, then executing the cook cycle;
(c) determining if the cook cycle calls for activation of a first magnetron and a second magnetron:
  (i) if the cook cycle calls for the activation of the first and second magnetrons, then deactivating the thermal heating source and then returning to step (b)(ii);
  (ii) if the cook cycle does not call for activation of the first and second magnetrons proceed to step (d) below:
(d) determining if the cook cycle calls for activation of only one magnetron;
  (i) if the cook cycle calls for activation of only one magnetron, then alternating the activation of the first magnetron and the second magnetron, such that only one of the first and second magnetrons is activated at a time, and activating the thermal heating source, and thereafter returning to the step (b)(ii); and
  (ii) if the cook cycle does not call for activation of only one magnetron, then activating the thermal heating source and return to step (b)(ii).

The above-described and other advantages and features of the present disclosure will be appreciated and understood by those skilled in the art from the following detailed description, drawings, and appended claims.

BRIEF DESCRIPTION OF THE DRAWINGS

FIG. 15 is a logic diagram of the steps used by the controller of FIG. 14 to maintain the 20 ampere or less draw by the oven according to the present disclosure.

DETAILED DESCRIPTION OF THE PREFERRED EMBODIMENT

Figure 1:
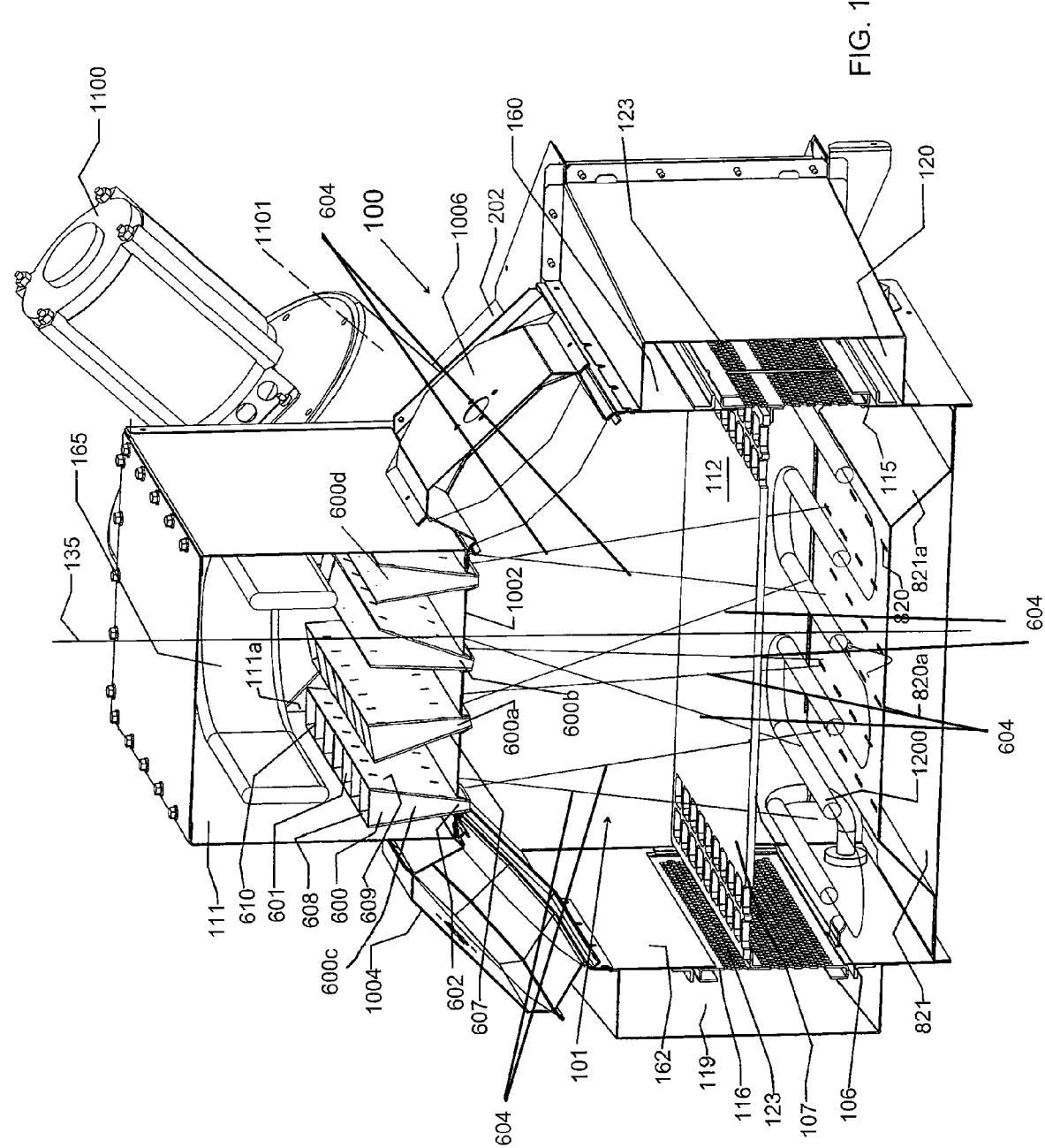
FIG. 1 is a partial front cross sectional perspective view of an exemplary embodiment of an oven according to the present disclosure.
Figure 2:
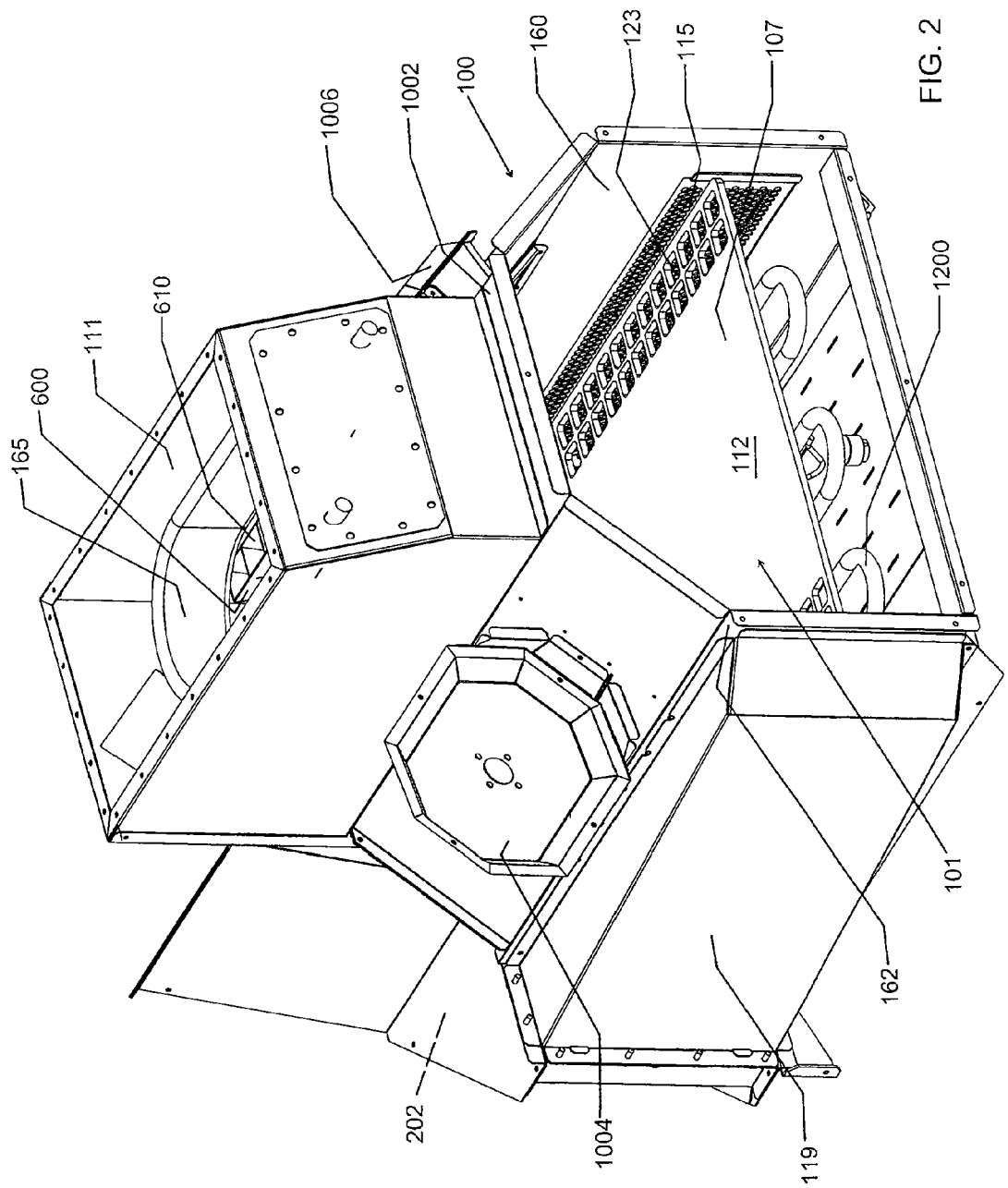
FIG. 2 is a partial top side perspective view of the oven of FIG. 1 with a blower motor removed.

While the present disclosure includes description in terms of a stand-alone or counter-top high-speed oven, it will be apparent to those skilled in the art that an oven according to the present disclosure may alternatively be implemented as a wall unit, a console model having feet adapted to rest on the floor, part of a vending machine, or other variations thereof.

Referring now to the drawings, in particular to FIGS. 1-7, a hybrid oven is illustrated therein based on a combination of heated air and microwave according to an exemplary embodiment of the present disclosure, generally designated by the reference numeral 100. It is first noted that these figures are merely schematic illustrations of an exemplary embodiment of the present disclosure based on various sectional views and are not intended to reflect the exact dimensions, scales or relative proportions of the oven 100 or components thereof, or the full engineering specification thereof, which should be apparent to those skilled in the art. The oven 100 comprises a cooking chamber generally designated 101, which is adapted to receive a food product or other item to be heated to be placed on a support 112 for heating.

The support 112 comprises a top surface 107 to support the food product and a bottom surface 106. The support 112 may further comprise one or more holes or openings 123 therein to facilitate gaseous communication between above the top surface 107 and below the bottom surface 106 of the support 112. The support 112 may be of any feasible shape, common shapes including rectangular and circular shapes. Referring to FIG. 1, when the "right side" and the "left side" of the support 112 are referred to in the following description, they are intended to refer to the two opposite sides of the support 112 as viewed in FIG. 1, wherein the "right" and the "left" are defined by a right side wall 160 and a left side wall 162 of the cooking chamber 101. In alternative embodiments, the support 112 for receiving and holding a food product in the cooking chamber 101 may be in a non-planar form, such as horizontally or vertically positioned skewer. In these cases, the "right" and the "left" sides of the support correspond to the opposite ends of the skewer. It should be appreciated that the "left" and the "right" sides of the support as referred to in the description depend on the configuration of the support and the cooking chamber.

The cooking chamber 101 is in fluid communication with return air plenums 119, 120, an air conduit 202 and an air inlet housing 111 that all form an air circulation and delivery system of the oven 100. The terms "air" and "airflow" are used interchangeably with "gas" and "gas flow" in this description unless otherwise noted. The return air plenums 119, 120 are positioned adjacent to side walls 160, 162 of the cooking chamber 101 and are adapted for gaseous communication with the cooking chamber 101 through return air openings 115, 116. Air opening 115 is formed through side wall 160. Air opening 116 is formed through side wall 162. FIG. 1 shows that, preferably, at least a portion of return air openings 115, 116 are positioned below support 112 and at least a portion of return air openings 115, 116 are positioned above support 112. Alternatively, return air openings 115, 116 may be positioned entirely below support 112. The return air plenums 119, 120 are adapted to receive the airflow from within the cooking chamber 101 to be guided to the air conduit 202.

Figure 3:
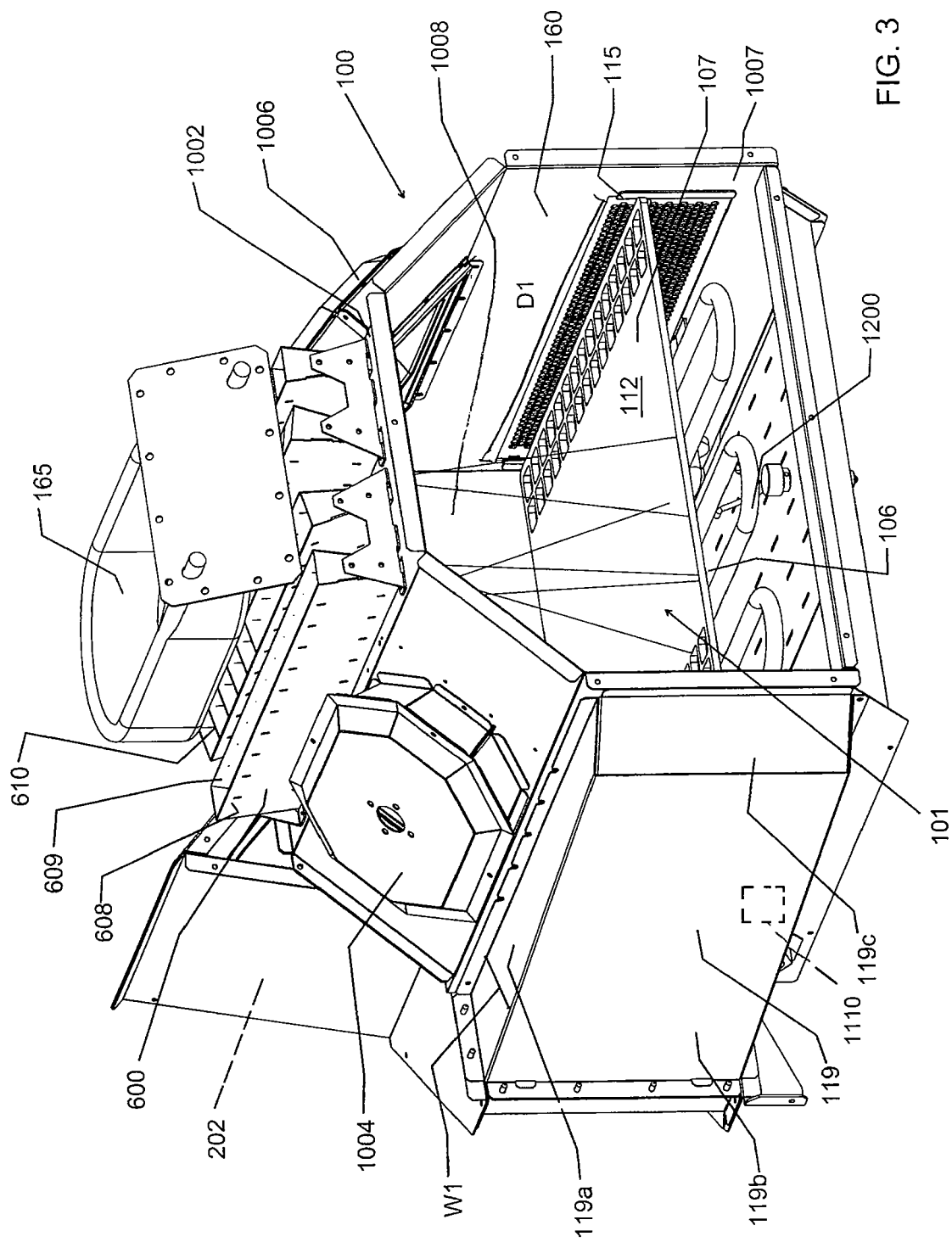
FIG. 3 is a partial top side perspective view of the oven of FIG. 1 with the blower motor and an air inlet housing removed.
Figure 5:
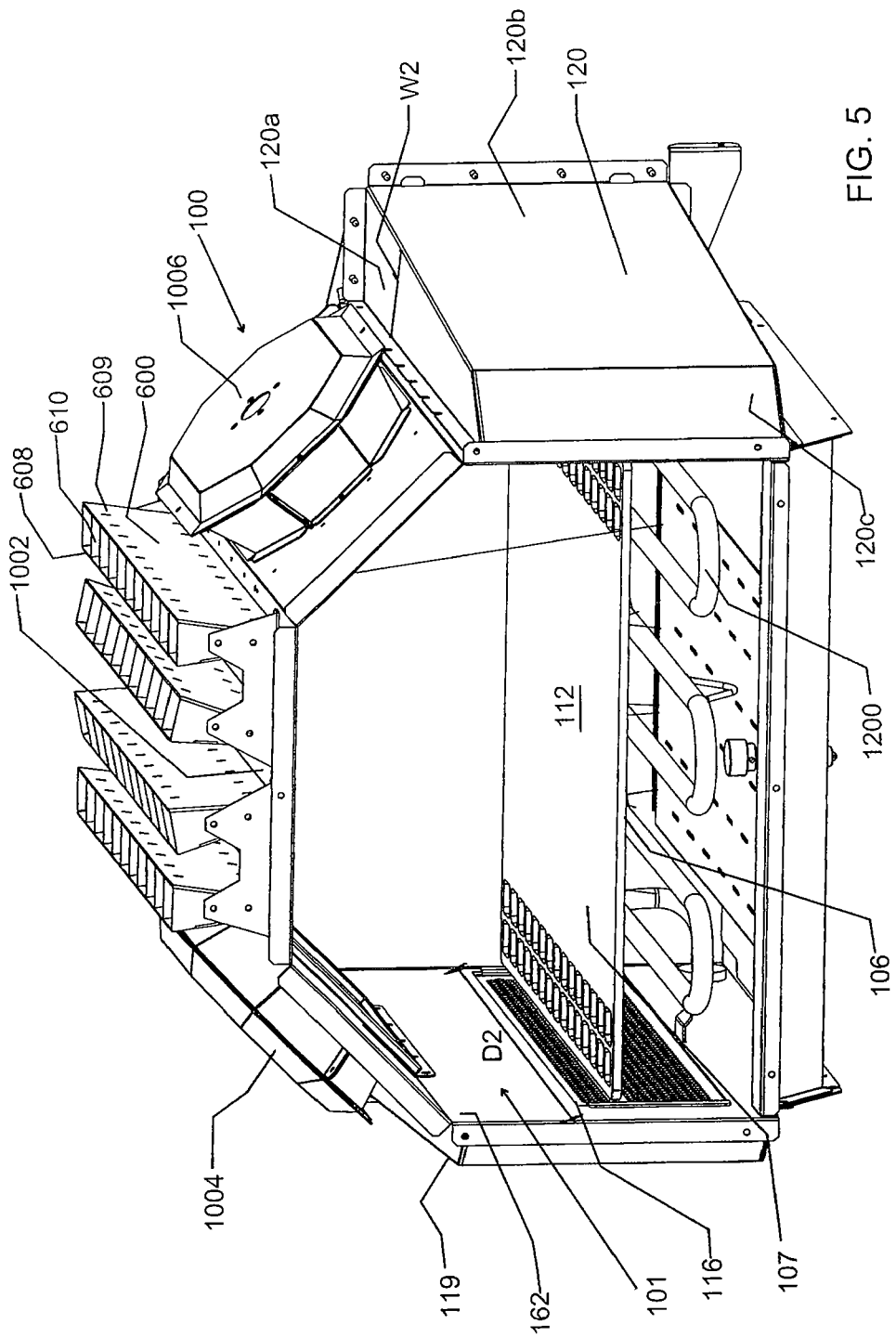
FIG. 5 is a partial top front perspective view of the oven of FIG. 1 with the blower motor, the air inlet housing, and a heating element removed.

The return air plenums 119, 120 are connected to an air conduit 202, which may be vertically disposed on the back side of the oven 100. The return air plenums 119, 120 each have an interior volume that increases in size toward conduit 202. As shown in FIG. 3, return air plenum 119 may have a top wall 119a, a side wall 119b, and a front wall 119c that connect to form return air plenum 119. Top wall 119a increases in a width W1 from front wall 119c to conduit 202 increasing the size of return air plenum 119. As shown in FIG. 5, return air plenum 120 may have a top wall 120a, a side wall 120b, and a front wall 120c that connect to form return air plenum 120. Top wall 120a increases in a width W2 from front wall 120c to conduit 202 increasing the size of return air plenum 120. The return air plenums 119, 120 that increase in size toward conduit 202 reduce a back pressure generated, for example, in return air plenums that do not increase in size toward conduit 202. Back pressure is a pressure that is directed against the heated airflow passing through return air openings 115, 116 from oven chamber 101. Reduced back pressure permits a greater amount of heated gas to be drawn into return air plenums 119, 120.

A catalytic converter (not shown) is positioned in each of return air plenums 119, 120. The catalytic converters filter grease particles and other contaminates from the heated airflow. The contaminates may be combustible substances that react with the materials of the catalytic converters to cause combustion to occur at a lower temperature than would normally be required for such combustion.

The air conduit 202 allows gaseous communication between the return air plenums 119, 120 and the air inlet housing 111 positioned on the top of the cooking chamber 101. For the sake of simplicity, the interconnected air circulation and delivery system of the air conduit 202, the return air plenums 119, 120, and the air inlet housing 111 will be referred to as a conduit. Each of the return air plenums 119, 120 may have its own air conduit for gaseous communication with the air inlet housing 111.

Figure 4:
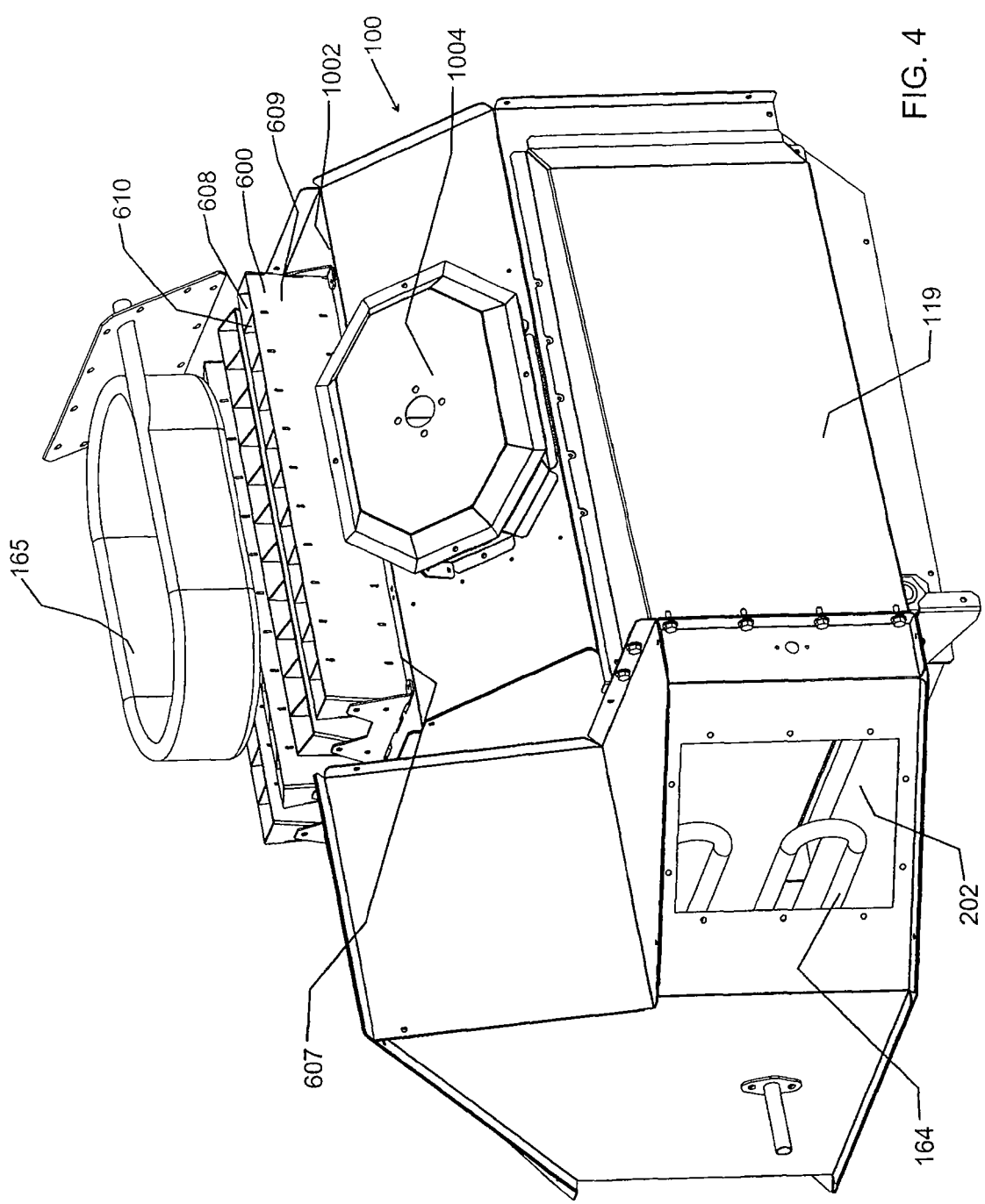
FIG. 4 is a partial top rear perspective view of the oven of FIG. 1 with the blower motor and the air inlet housing removed.

As shown in FIG. 4, a thermal energy source 164, such as parallel heating coils, may be coupled to or disposed in the air conduit 202 to heat the air disposed therein. As shown in FIGS. 1-7, thermal energy source 165 may be coupled to or disposed in air inlet housing 111 to heat the air disposed therein. Thermal energy source 165 may include a first heating coil and a second heating coil that are operated independently so that the first heating coil may be activated while the second heating coil is deactivated and vice versa, or the first and second heating coils may each be activated together or not at all. Activating the first heating coil and the second heating coil separately reduces a draw of energy by thermal energy source 165 over activation of the first heating coil and the second heating coil together. One or both of return air plenums 119, 120 may have a thermal energy source therein.

A blower 1101 circulates the air in the air circulation and delivery system defined by the cooking chamber 101, the return air plenums 119, 120, the return air conduit 202 and the air inlet housing 111, and provides the desired heated airflow onto the product placed on the support 112 in the cooking chamber 101. The blower may have a blower motor 1100.

Oven chamber 101 may include an infrared element 1200 therein. Infrared element 1200 heats the product on support 112 from below the support. Infrared element 1200 may brown the product on support 112 to give a crunchiness to product. A preferred embodiment of oven 100 has infrared element 1200 that heats support 112 that then heats the food product placed thereon. Alternatively, wherein support 112 is a grill, infrared element 1200 browns the food product on support 112 from below the support 112.

Below infrared element 1200 is a bottom plenum 821. Bottom plenum 821 is formed by a wall 821a that has bottom air inlets 820. Bottom plenum 821 is in fluid communication with air inlet housing 111 such that heated air traverses air passageway conduit or duct 111a and, thereafter, traverses past the back wall of oven 100 and is in communication with bottom plenum 821 such that the air passes through air inlets 820. In operation, the blower 1101 circulates air into bottom plenum 821 and out bottom air inlets 820 so that the air passes around infrared element 1200. Because of the location of the air inlets 820 beneath infrared element 1200, the airflow passing across infrared element 1200 reduces the internal temperature of infrared element 1200 to less than 1300 degrees Fahrenheit and the temperature of adjacent surfaces to below 600 degrees Fahrenheit, thereby substantially reducing the threat of ignition of the grease disposed on plate 821a. The air that passes through bottom air inlets 820 is removed from oven chamber through openings 115, 116 by the negative air pressure generated by the blower.

As shown in FIG. 3, a temperature sensor 1110 may be located within the air circulation and delivery system defined by the cooking chamber 101, the return air plenums 119, 120, the return air conduit 202 and the air inlet housing 111. Temperature sensor 1110 may capture the temperature of the air within the air circulation and delivery system and supply that information to a controller of oven 100, which may fully activate, partially activate, partially deactivate or fully deactivate one or more of thermal energy source 164, thermal energy source 165 and infrared element 1200 based upon the relationship of the measured temperature of the air to the operating temperature of oven 100. Temperature sensor 1110 is shown schematically in FIG. 3 as positioned in return air plenum 119.

Figure 10:
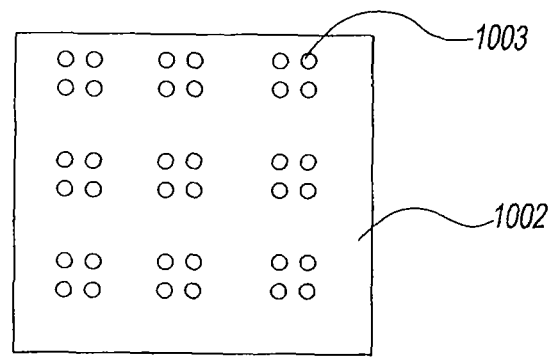
FIG. 10 is a front plan view of a top wall having grouped apertures therethrough.
Figure 11:
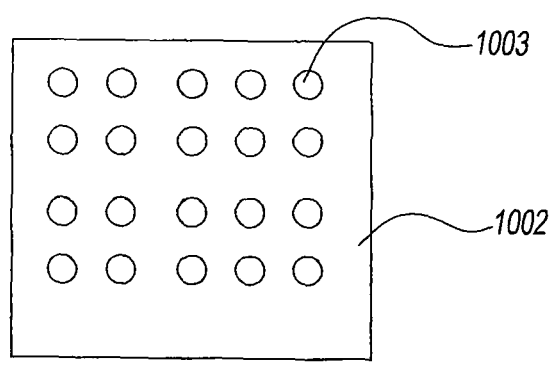
FIG. 11 is a front plan view of the top wall having apertures therethrough in a substantially uniform pattern.
Figure 12:
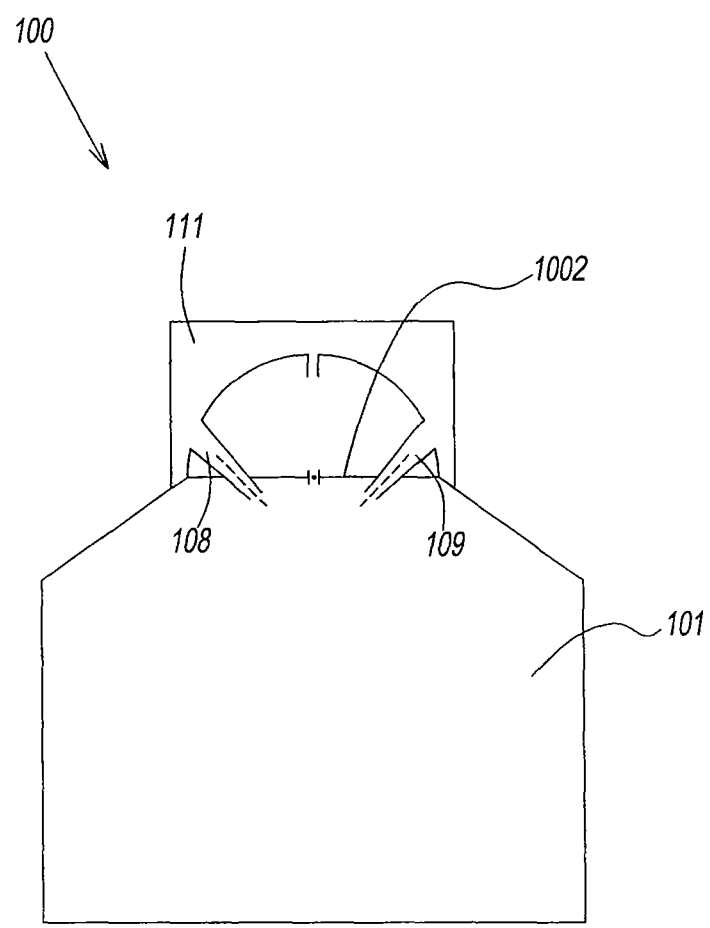
FIG. 12 is a partial side cross sectional view of the air inlet housing, the cooking chamber, and the top wall having nozzles therethrough.

Tubes 600 disposed through a top wall 1002 may be used to provide a heated airflow into cooking chamber 101. Alternatively, top wall 1002 may have apertures 1003 therethrough, as shown in FIG. 10, that are grouped together; top wall 1002 may have apertures 1003 therethrough uniformly distributed, as shown in FIG. 11; top wall 1002 may have nozzles 108 and 109 therethrough, as shown in FIG. 12 and disclosed in U.S. Patent Application Publication No. 2009/0236331 that is hereby incorporated by reference in its entirety; or any combination thereof, any of which may be used to provide a heated airflow into cooking chamber 101. Components 608 and 609 form a tube body and one or more slats or spacers 610. These components may be made of sheet metal. Each tube 600 has a tube inlet 601 in air inlet housing 111 of the oven 100 to receive a heated gas, and a tube outlet 602 in cooking chamber 101 of the oven 100 to provide the heated gas into the cooking chamber in the form of an airflow.

The tube 600 may be in the shape of an inverted truncated triangular prism, with the tube inlet 601 corresponding to the base of the prism and the tube outlet 602 corresponding to the truncated top of the prism. The tube inlet 601 is larger than the tube outlet 602 at a ratio optimized to form a tight plume of the heated airflow. The dimension of the tube 600 may optimize the formation of an airflow by forming, for example, a plume array of heated gas and thereby the performance of the oven 100. The length of the tube is preferably long enough to establish a directional flow of heated gas in the form of a plume, but not too long so as to require the height of the oven 100 to be objectionable in terms of cost and size considerations. Each tube is preferably wide enough to introduce a sufficient volume of heated gas into the cooking chamber to rapidly cook a food product in the oven. At the same time, the tube outlet 602 is preferably narrow to facilitate the formation of a tight plume of the airflow. The tube 600 forms a planar band of moving heated gas or a plume array, in contrast to air impingement that includes discrete columns of air that are spaced from one another and that strike the food at substantially a 90 degree angle with the support.

The spacers 610 may be placed within the inside of the tube 600, uniformly spaced in parallel. The spacers 610 serve to prevent microwave energies in a cooking chamber from entering the tube 600. For this purpose, the spacers 610 may be less than 1.2 inches spaced apart from each other. Each of the spacers 610 may extend from the tube outlet 602 to the tube inlet 601. In an alternative embodiment, each spacer 610 may extend, for example, only about half an inch inward from the tube outlet 602. While both examples serve to substantially prevent microwave entry into the tube 600, it appears that the longer version of the spacer 610, extending from the tube outlet 602 to the tube inlet 601 better enables the evenness of the heated airflow along the width of the tube compared to the shorter version.

A configuration of four of tubes 600 may be included in oven 100. In a preferred embodiment of an oven 100 capable of cooking a 14 inch pizza, each of 4 tubes 600 may be about 12 inches long with tube outlet 602 that has a width resulting in a total open surface area of greater than or equal to about 6 square inches, and, preferably, tube outlet 602 is about 0.2 inches wide resulting a total open surface area of about 9.5 square inches, through which the air leading into the oven cavity passes, in contrast to about 4 square inches of open surface area leading into the oven cavity typical of hot air impingement ovens of similar size. Center tubes 600a and 600b have airflows that meet each other above the product being heated and contacts a center portion thereof. Outer tubes 600c and 600d have airflows that direct air within the oven to the product being heated to provide more efficient heat transfer to the outer periphery of the food product. In combination all four tubes 600a, 600b, 600c, and 600d provide more even heat transfer to the product being heated, thereby ensuring that more air comes in contact with the food product than conventional impingement airflow. The configuration of four of tubes 600 allows for thermal energy source 165 that can heat all of the air drawn through each of the four tubes 600. A surrounding area 607 where the tube 600 penetrates a top wall 1002 of the cooking chamber 101 is firmly sealed to prevent any air leakage into the cooking chamber.

The heated airflow provided by tubes 600 flow into oven chamber 101 through tubes 600, as shown by lines 604, by an airflow generated by the blower and out of the oven chamber through openings 115, 116 into return air plenums 119, 120. The openings 115, 116 may be positioned substantially at or along the intersection of the direction of the airflow of heated gas and each of side walls 160, 162 of the cooking chamber 101. In this configuration, the airflow generated by the tube 600 strikes a product on support 112 at an angle and is drawn across the surface of the product toward its edges and the edge of the support and then finally toward openings 115, 116. The heated airflow is communicated through openings 115, 116 into return air plenums 119, 120. The heated airflow is communicated into conduit 202 from return air plenums 119, 120. The heated airflow is communicated into air inlet housing 111 from return conduit 202 to be recirculated into oven chamber 101. A portion of the heated airflow may be vented from oven 100 into the ambient environment from oven chamber 101, return air plenums 119, 120, conduit 202, and/or air inlet housing 111. It is found that this configuration reduces a noise level by as much as 80% over conventional impingement ovens that strike the food at substantially a 90 degree angle with the support.

One example of a noise reduction of an embodiment of oven 100 as compared to a conventional impingement oven included obtaining data using a decibel (dB) meter two feet away from both the embodiment of oven 100 and the conventional impingement oven—first with a wand of the dB meter located 3 feet above ground and second with the wand of the dB meter located 5 feet above the ground. Both the embodiment of oven 100 and the conventional impingement oven were on carts that put a bottom of both ovens 30 inches off the ground—which is to say that the measurement taken 3 feet above the ground was about 2 inches high on both ovens after taking into account the 4 inch legs, and the measurement taken 5 feet above the ground was located about 2 inches below a top of both ovens. Again, all measurements were taken at a distance of about 2 feet from both ovens. Table A shows data obtained from the decibel meter:

TABLE A

All Data Taken 2 Feet from Oven

| | 3 feet above around | | 5 feet above ground | |
|---|---|---|---|---|
| | Idle | 100% blower | Idle | 100% blower |
| conventional impingement oven | 66.0 | 70.5 | 66.4 | 71.0 |
| One embodiment of oven 100 | 55.2 | 57.7 | 54.9 | 57.6 |

Decibels (dB) are measured in a logarithmic scale, which in general means that an increase from, for example, about 50 dB to about 60 dB means an increase of noise level of 10 times. For example, normal conversation is measured at about 60 dB and a rock concert is measured at about 105 dB. Accordingly, as shown in Table A, the one embodiment of oven 100 has a noise level that is substantially reduced over the conventional impingement oven.

Figure 8:
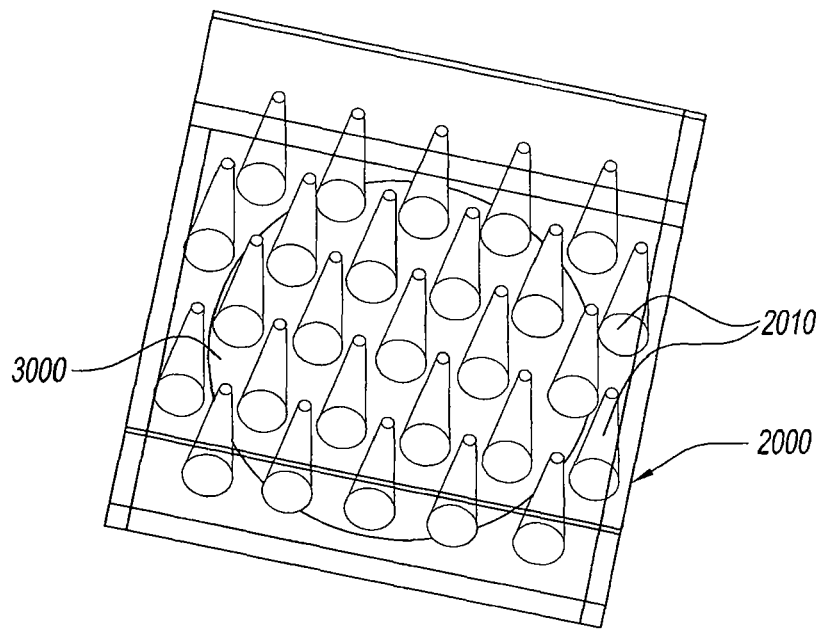
FIG. 8 is a schematic top perspective view of columns of air formed in an impingement oven of the prior art.
Figure 9:
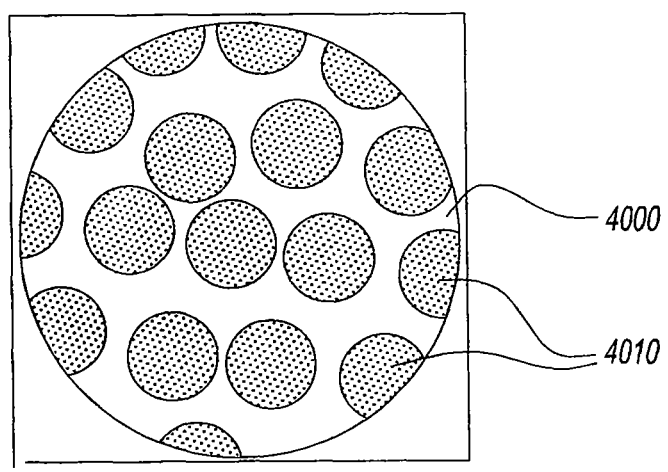
FIG. 9 is a food product cooked in an impingement oven of the prior art.

It is found that this configuration of the tubes 600 that promotes striking a product with heated airflow on support 112 at an angle whereby the heated air is then drawn across the surface of the product toward its edges and the edge of the support and then finally toward openings 115, 116, further improves the heat transfer between the heated air and the product so that a greater amount of heated air contacts the product on support 112 to be heated. It has been unexpectedly found that tubes 600 in combination with return air plenums 119, 120 having increased size toward conduit 202 and decreased back pressure further increases the heated air that contacts the product on support 112. It has also been found by the present disclosure that the greater amount of heated air contacting the product on support 112 of oven 100 is achieved at a lower blower speed than conventional impingement ovens, for example, about 3000 RPM to about 4000 RPM at 100 percent velocity. In contrast, as shown in FIG. 8, a conventional impingement oven 2000 has discrete columns of air 2010 that are spaced from one another and that strike food 3000 at substantially a 90 degree angle with the support so that only a portion, for example, about 27%, of food 3000 is contacted by columns of air 2010. Referring to FIG. 9, a food product 4000 cooked in an impingement oven of the prior art is shown. Food product 4000 has darker portions 4010 where the discrete columns of air contacted the food product. The darker portions 4010 contact less of a food product than oven 100. In addition, conventional impingement ovens have less air flow in contact with the product being heated generated by a blower having a blower speed of 6000 RPM to 8000 RPM at 100 percent velocity. Accordingly, oven 100 can achieve faster heating times with a lower use of energy, e.g., electricity, over conventional impingement ovens. By oven 100 doubling the CFM of air delivered to a cook cavity capable of cooking a 14" pizza, oven 100 is delivering a 2× or two time improvement over conventional impingement ovens. However, achieving this increased airflow while concurrently cutting RPM in half over conventional impingement ovens, a 4× or four time total improvement over conventional impingement ovens is achieved.

As shown in FIG. 3, return air opening 115 is formed through side wall 160 and extends a distance D1 that is substantially an entire distance from a front 1007 of oven chamber 101 to a rear 1008 of oven chamber 101. As shown in FIG. 5, air opening 116 is formed through side wall 162 and extends a distance D2 that is substantially an entire distance from front 1007 of oven chamber 101 to rear 1008 of oven chamber 101.

Turning now to the microwave-cooking feature of the present disclosure, in addition to the circulation of the heated airflow, the oven 100 further comprises a pair of magnetrons (not shown), which are respectively positioned at the opposite upper corners of the cooking chamber 101 to launch microwave energies by waveguides (not shown) through launching horns 1004, 1006 having an antenna (not shown) therein, into the cooking chamber 101 through a ceramic partition separating each horn from cooking chamber 101. While the oven 100 according to the exemplary embodiment in FIG. 1 uses two magnetrons, the present disclosure is not necessarily limited by the number of magnetrons to generate microwave energies to be guided and launched into the cooking chamber 101. Launching horns 1004, 1006 are shown as having an octagonal shape, however, the launching horns may be any shape, for example, rectangular. Furthermore, depending on the configuration of the support 112 and the cooking chamber 101 of the oven, the positions of the launching horns 1004, 1006 may be selected from various possible choices. For example, in an alternative embodiment, a pair of launching horns may be positioned respectively at the opposite bottom corners of the cooking chamber. In yet another alternative embodiment, a pair of launching horns may be positioned respectively at the upper and the lower portions of a side wall of the cooking chamber to apply the microwave energy sideways to a food product held by a vertically positioned support such as a skewer.

Figure 6:
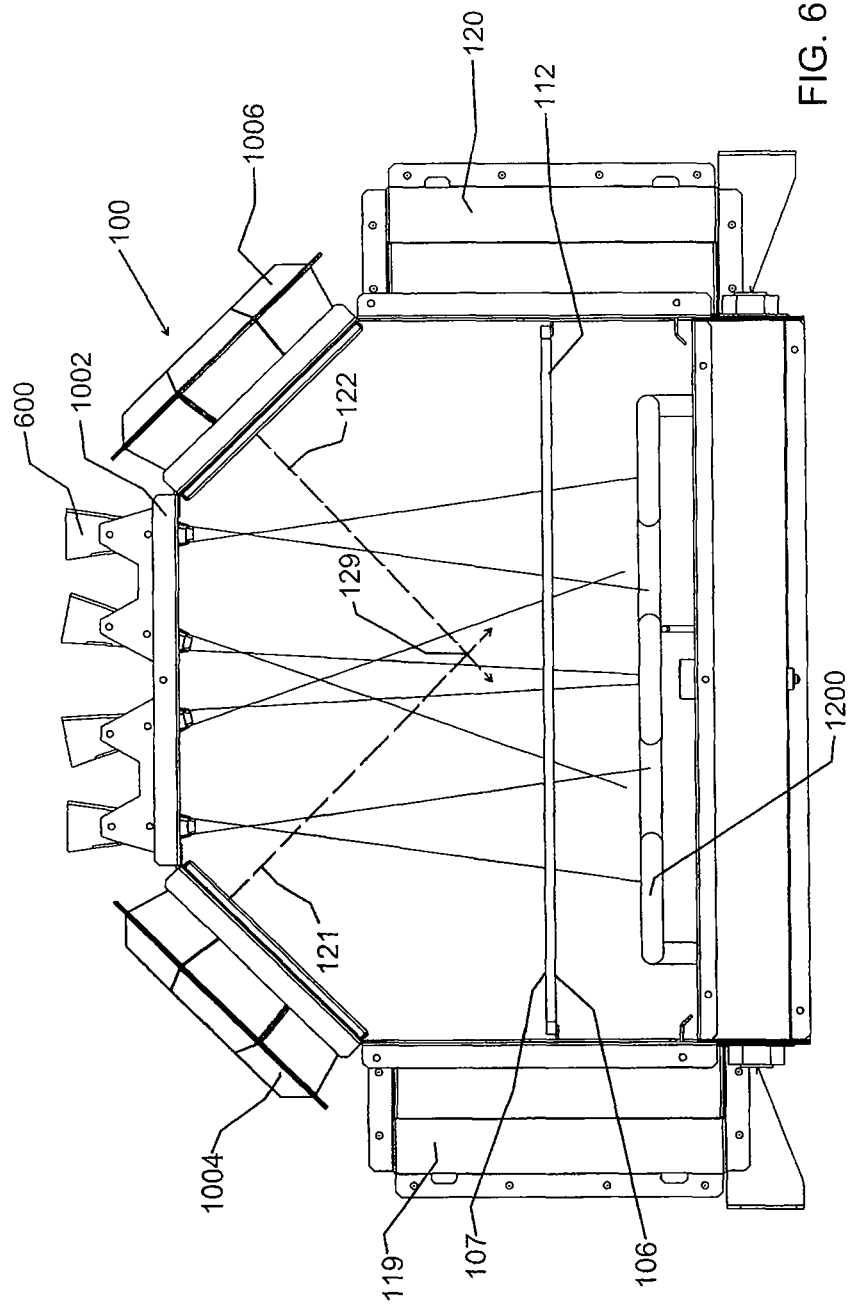
FIG. 6 is a partial front plan view of the oven of FIG. 1 with the blower motor, the air inlet housing, and the heating element removed.
Figure 7:
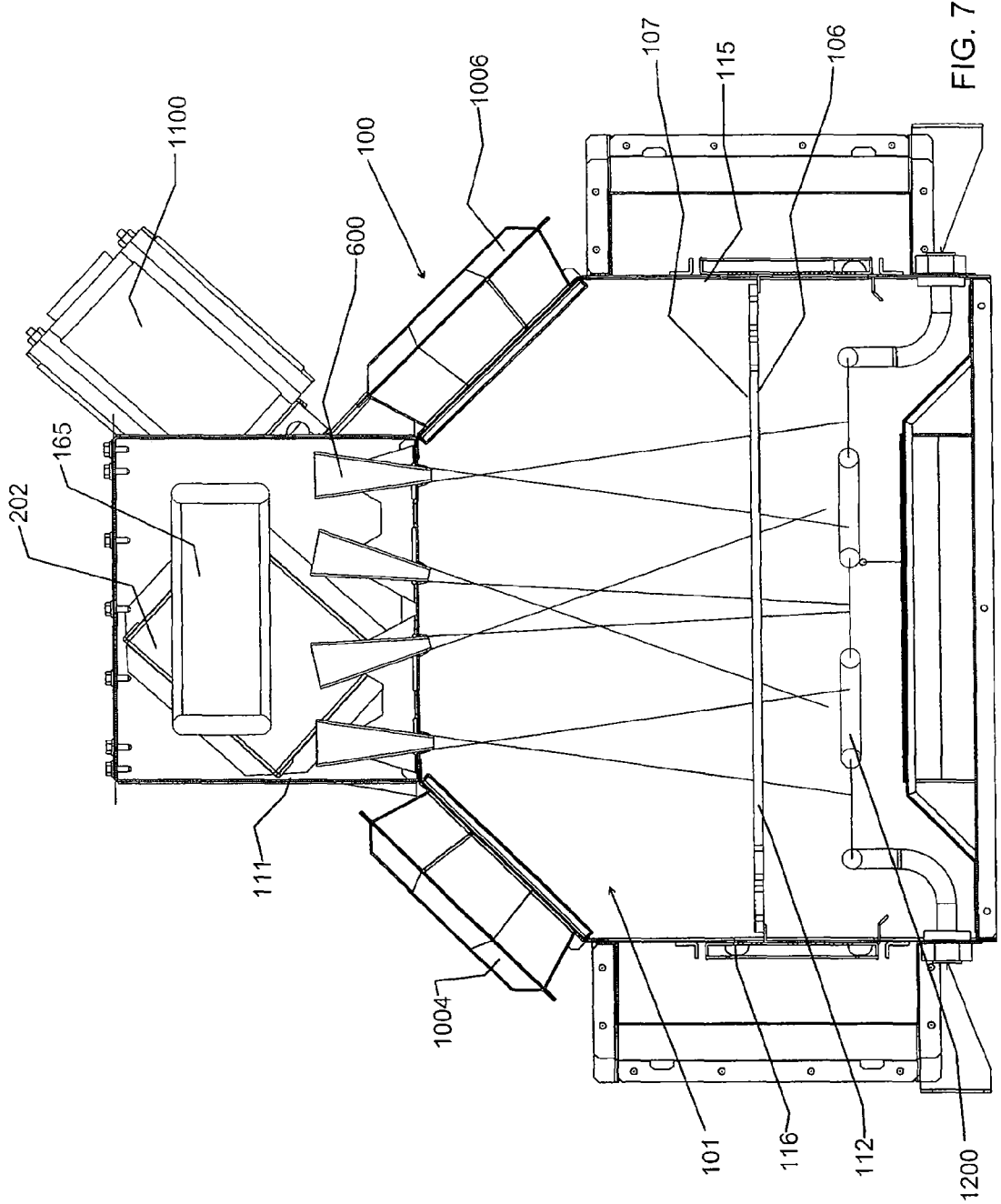
FIG. 7 is a partial front plan view of the oven of FIG. 1.

Referring to FIG. 6, the pair of launching horns 1004, 1006 are adapted to direct the microwave energies in respective general directions as indicated by the dotted lines 121 and 122. These directions 121 and 122 are at an angle with respect to vertical axis 135, as shown in FIG. 1, of the cooking chamber 101 (or the horizontal plane of the support 112) and cross at a point 129 at a distance from the support 112, that may be vertically above the midpoint between the left and the right sides of the support 112. The oven 100 may be configured in such a way that this microwave crossing point 129 may take place above the upper surface of any product placed on the support 112.

Referring now to FIGS. 1-7, the oven 100 may further comprise a microwave modulator (not shown in the figures) for controlling the amount of the microwave energies propagated into the cooking chamber 101. The microwave modulation may be achieved by various devices. One example of microwave modulation can be achieved by simply switching on and off the power to each of the magnetrons, either manually or by some suitable automatic controller. In another example, the microwave modulation may be achieved by a voltage regulator capable of varying the voltage applied to each of the magnetrons in a controlled manner.

The microwave modulator having an automatic control device that periodically changes the power or voltage applied to each of the magnetrons, thereby creating a periodic modulation (e.g., sinusoidal modulation, periodic step function modulation, etc.) in time of the microwave energy. By periodically alternating between the left and the right magnetrons through each of launching horns 1004, 1006, the microwave modulator may provide periodic modulations in the microwave energies respectively from the left and the right launching horns 1004, 1006. This configuration provides an even distribution of microwave energy and desirable heat transfer.

The configuration of launching horns 1004, 1006 in conjunction with the above-described microwave modulator may be operated to cause a time-dependent variation. For a predetermined time period, the microwave modulator may turn on only the left magnetron through launching horn 1004 while keeping the right magnetron turned off, thereby allowing microwave energy to radiate only from the left magnetron through launching horn 1004. For another predetermined time period, the microwave modulator may keep the right magnetron on while maintaining the left magnetron turned off of the power, thereby allowing only the right magnetron to propagate the microwave energy into the cooking chamber 101 through launching horn 1006. A controller of oven 100 may operate all components thereof in order to run or operate on a 208 volt 20 ampere or 240 volt 20 ampere electric service. The controller of the oven 100 may operate oven 100 with various possible combinations and sequences of operating any of the thermal energy source 164, thermal energy source 165, infrared element 1200, the blower, one or both of the magnetrons, and any combinations thereof, in order to run on the 208 volt 20 ampere or 240 volt 20 ampere single phase electric service. In addition, the operations of the thermal energy source 164, thermal energy source 165, infrared element 1200, the blower and the microwave modulator for controlling the microwave energy into oven chamber 101 may be coordinated and synchronized with each other to achieve the desired heat transfer effect to run on the 208 volt 20 ampere or 240 volt 20 ampere single phase electric service. The magnetrons, for example, may draw between about 6.8 amperes and about 7.4 amperes and can be activated only one at a time in order to reduce energy consumption of the magnetrons. An alternative example, the controller of the oven 100 operates the magnetrons together without operating thermal energy source 164, thermal energy source 165 or any other thermal energy source to run on the 208 volt 20 ampere or 240 volt 20 ampere single phase electric service. Yet another embodiment operates the magnetrons together with one or more of thermal energy source 164, thermal energy source 165 or infrared element 1200, whereby the thermal energy source or infrared element is sized sufficiently to operate together with both magnetrons without drawing more than 20 amperes from a 208 volt or 240 volt single phase electric service.

It is well known in the art that varying the amount of heat and microwave energy which is delivered by a hybrid oven to a food product within its cook cycle can yield desirable results. Typical hybrid ovens allow the operator to enter various blower speeds and microwave energy levels for different portions of the cook cycle. For example, the first 30 seconds of a 90 second cook cycle might be characterized by operating the blower at 50% of its maximum capacity and the magnetrons at 100% of their maximum capacity; the second 20 seconds might be characterized by operating the blower at 70% of its maximum capacity and the magnetrons at 80% of their maximum capacity; and the final 40 seconds might be characterized by operating the blower and the magnetrons at 100% of their maximum capacity, all the while with one or more of thermal energy source 164, thermal energy source 165 and infrared element 1200 being activated and deactivated by the controller based upon the relationship of the measured temperature of the air to the operating temperature of oven 100. In a preferred embodiment of oven 100, the operation the magnetrons at or near their maximum capacity at the same time one or more of the thermal energy source 164, thermal energy source 165 and infrared element 1200 are activated by the controller in response to the measured temperature of the oven being below the operating temperature of oven 100 would require more than 20 Amperes of current from a single phase 208 or 240 Volt electric supply. In this preferred embodiment, the operation of both magnetrons at or near their maximum capacity overrides the controller directed activation of one or more of thermal energy source 164, thermal energy source 165 and infrared element 120 such that oven 100 is precluded from drawing more than about 20 Amperes of current from a single phase 208 or 240 Volt electric supply.

Table B includes example configurations of modes of operation for oven 100 controlled by the controller:

TABLE B

EXAMPLE ELECTRICAL CONFIGURATAION OF 20 AMP HIGH SPEED COMBINATION OVEN

|  | 208 V | 240 V | 208 V | 240 V |
|---|---|---|---|---|
| Magnetron Amperes | 7.40 | 6.80 | 7.40 | 6.80 |
| Other Amperes | 1.80 | 1.80 | 1.80 | 1.80 |

| STANDARD CONFIGURATION | | | RADIANT IR CONFIGURATION | | |
|---|---|---|---|---|---|
| Heater 1 Watts | 1803 | 2400 | Heater 1 Watts | 751 | 1000 |
| Heater 2 Watts | 1803 | 2400 | Heater 2 Watts | 1502 | 2000 |
| Total | 3605 | 4800 | Infrared element Watts | 1352 | 1800 |
|  |  |  | Total | 3605 | 4800 |

|  | CONFIG 1 | CONFIG 2 | CONFIG 3 | CONFIG 4 | CONFIG 5 | CONFIG 6 |
|---|---|---|---|---|---|---|
| Magnetron Amperes | 7.4 | 0.0 | 14.8 | 7.4 | 0.0 | 14.8 |
| Other Amperes | 1.8 | 1.8 | 1.8 | 1.8 | 1.8 | 1.8 |
| Heaters (non IR) Amperes* | 7.8 | 15.6 | 3.3 | 3.3 | 9.8 | 3.3 |
| Total Watts | 1,803 | 3,605 | 751 | 751 | 2,253 | 751 |
| Infrared element Amperes* | 0.0 | 0.0 | 0.0 | 5.9 | 5.9 | 0.0 |
| Total Amperes of configuration | 17.0 | 17.4 | 19.9 | 18.3 | 17.4 | 19.9 |

|  | CONFIG 7 | CONFIG 8 | CONFIG 9 | CONFIG 10 | CONFIG 11 | CONFIG 12 |
|---|---|---|---|---|---|---|
| Magnetron Amperes | 6.8 | 0.0 | 13.6 | 6.8 | 0.0 | 13.6 |
| Other Amperes | 1.8 | 1.8 | 1.8 | 1.8 | 1.8 | 1.8 |
| Heaters (non IR) Amperes * | 9.0 | 18.0 | 3.8 | 3.8 | 11.3 | 3.8 |
| Total Watts | 2,400 | 4,800 | 1,000 | 1,000 | 3,000 | 1,000 |
| Infrared element Amperes * | 0.0 | 0.0 | 0.0 | 6.8 | 6.8 | 0.0 |
| Total Amperes of configuration | 17.6 | 19.8 | 19.2 | 19.1 | 19.8 | 19.2 |

* Amperage draw of heaters is calculated as 90% of theoretical maximum draw.

Table B includes magnetrons used with a 208 volt ("V") power service that have an amperage of 7.40 amperes and magnetrons used with a 240V power service that have an amperage of 6.80 amperes. "Heaters" include one or more heating elements, e.g., thermal energy source 164 or thermal energy source 165. "Other Amperes" includes all other power draws of oven 100 other than the magnetrons, infrared element 1200 or "Heaters". "Standard Configuration" includes a configuration that does not include infrared element 1200. "Radiant IR Configuration" includes a configuration with both "Heaters" and infrared element 1200. "CONFIG" is an abbreviation for "configuration" in Table B. Table B includes a "Total Amperes of configuration" for each oven configuration that provides an amperage that the configuration of oven 100 runs on.

CONFIG 2, CONFIG 5, CONFIG 8, and CONFIG 11 are configurations of oven 100 that do not include amperage of the magnetrons. CONFIG 2, CONFIG 5, CONFIG 8, and CONFIG 11 may be an embodiment of oven 100 that does not include magnetrons or the controller of oven 100 may not activate the magnetrons of oven 100. CONFIG 1, CONFIG 2, CONFIG 3, CONFIG 6, CONFIG 7, CONFIG 8, CONFIG 9 and CONFIG 12 do not include amperage from infrared element 1200. CONFIG 1, CONFIG 2, CONFIG 3, CONFIG 6, CONFIG 7, CONFIG 8, CONFIG 9 and CONFIG 12 may be an embodiment of oven 100 that does not include infrared element 1200 or the controller of oven 100 may not activate infrared element 1200 of oven 100.

As shown in Table B, oven 100 may run on equal to or less than about 20 amperes. Table B indicates that amperage draw of "Heaters" is calculated and that an actual draw will be slightly less, about 90 percent, of the maximum amperage of the "Heaters". For example, due to changing resistance at higher temperatures and other factors, thermal energy source 164 and/or thermal energy source 165 and/or infrared element 1200 will not typically draw as much amperage as their specified wattage during oven operation. Accordingly, Table B includes examples that are theoretical in nature and the amperages and wattages may vary during actual use. Table B includes examples based on a single phase wiring system as opposed to a 3 phase wiring system. One skilled in the art may modify these examples for a 3 phase wiring system based on the present disclosure. Table B includes examples within the electrical supply standards as may be available within the United States of America. One skilled in the art may modify these examples for the electrical supply that may be available in other countries based on the present disclosure.

The optimal microwave efficiency may also be achieved by matching the size of the cooking chamber 101 with the microwave load. It is found that the optimal matching can be achieved by sizing preferably all, but at least one, of the vertical height, and horizontal width and depth of the cooking chamber 101 (as viewed in FIG. 1) in integer multiples of the microwave wavelength (approximately 4.82 inches in free space). Such dimensions of the cooking chamber 101 facilitate the accommodation of standing microwaves in the cooking chamber 101, thereby minimizing the reflection of microwaves at the walls of the cooking chamber and the resulting loss of the microwave energy to the cavities, plenums, magnetrons, etc. Hence, to optimize the microwave efficiency, preferably all, but at least one, of the vertical height, and the horizontal width and depth of the cooking chamber 101 of the oven 100 is sized in integer multiples of the microwave wavelength, or selected from one of 4.82 inches, 9.64 inches, 14.46 inches, 19.28 inches, 24.10 inches, etc.

As discussed herein, consumers of food prepared by high-speed ovens have come to expect certain standards of cook quality and also service time windows that food products, such as a 14 inch pizza, prepared in high-speed ovens must be delivered in, for example, about 2 minutes. Although currently available high-speed ovens require a 208 volt or 240 volt 30 ampere electric service to achieve the desirable cook quality within the acceptable service window, it has been found by the present disclosure that oven 100 can operate on a 208 volt 20 ampere or 240 volt 20 ampere electric service while providing acceptable cook quality within the acceptable service time window established within the high-speed oven industry. Accordingly, oven 100 minimizes and/or eliminates warm-up periods between cooking different food products allowing repetitious cooking. Oven 100 uses less power than ovens that require a 208 volt or 240 volt 30 ampere electric service. Less power consumption by oven 100 than ovens that require a 208 volt or 240 volt 30 ampere electric service results in cost savings as well.

Industry standards, such as, Underwriters Laboratories standards, require adherence to different standards for ovens using a 208 volt or 240 volt 30 ampere electric service than ovens using a 208 volt 20 ampere or 240 volt 20 ampere electric service. For example, Underwriters Laboratories requires a different wire and plug configuration for ovens using a 20 ampere electric service than ovens using 30 ampere electric service. Underwriters Laboratories requires more rigorous testing for appliances that operate off of 20 ampere electric service than 30 ampere electric service. Most building code standards for a 208 volt 30 ampere or 240 volt 30 ampere electric service require wire between a breaker box and an outlet of a power source that is of a thicker gauge than ovens using a 208 volt 20 ampere or 240 volt 20 ampere electric service. Accordingly, oven 100 that uses a 208 volt 20 ampere or 240 volt 20 ampere electric service has a much lower installation of cost than currently available high-speed ovens that require a 208 volt or 240 volt 30 ampere electric service.

Figure 13:
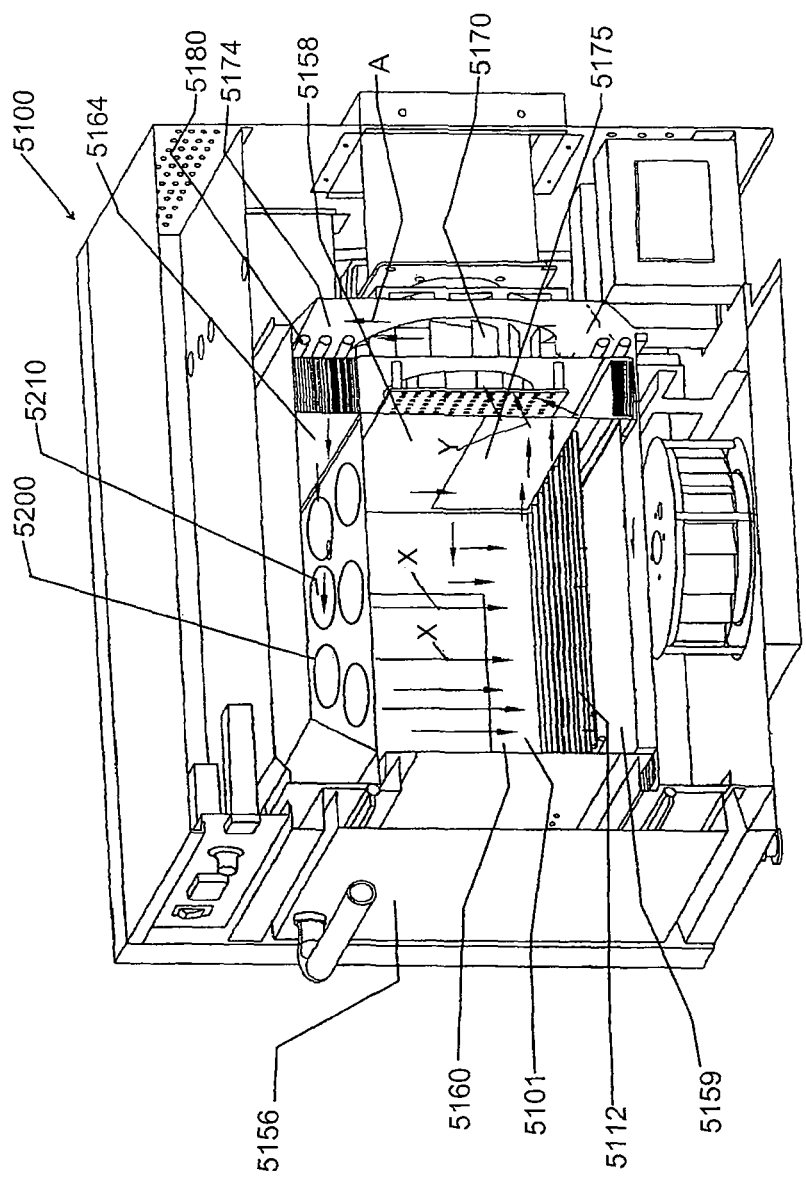
FIG. 13 is a partial side cross-sectional view an alternative embodiment of an oven according to the present disclosure that uses impingement.

Referring now to the drawings, in particular to FIG. 13 thereof, therein illustrated is a hybrid oven based on a combination of heated air and microwave according to an alternative exemplary embodiment of the present disclosure, generally designated by the reference numeral 5100.

The oven 5100 comprises a cooking chamber generally designated 5101, which is adapted to receive a food product or other item to be heated to be placed on a support 5112 for heating. Cooking chamber 5101 is formed by a door 5156, a rear wall 5158, a bottom wall 5159, a top wall 5200, a first side wall 5160 and a second side wall (not shown) opposite the first side wall. A housing 5164 surrounds cooking chamber 5101 forming a conduit 5174. Conduit 5174 has a blower 5170 therein that generates an airflow. Rear wall 5158 has a return opening 5175 that provides fluid communication between cooking chamber 5101 and conduit 5174. Conduit 5174 has a heating element 5180 that heats the airflow in conduit 5174.

In operation, blower 5170 directs the airflow through conduit 5174 into contact with heating element 5180, as shown by arrow A. The airflow flows through top wall 5200 onto support 5112, as shown by arrows X, and onto any product thereon. Top wall 5200 is shown having relatively large and few openings 5210, however, it is contemplated by the present disclosure that top wall has any configuration shown in FIGS. 1-7 and 10-12 described herein. The airflow returns from cooking chamber 5101 to conduit 5174 through return opening 5175, as shown by arrows Y. Oven 5100 may also have a microwave generator that communicates microwave energy into oven chamber 5101. The top wall, blower, heating element, microwave generator, and any other component of oven 5100 that requires a power source may be configured to run on a 208 volt 20 ampere or 240 volt 20 ampere electric service.

Figure 14:
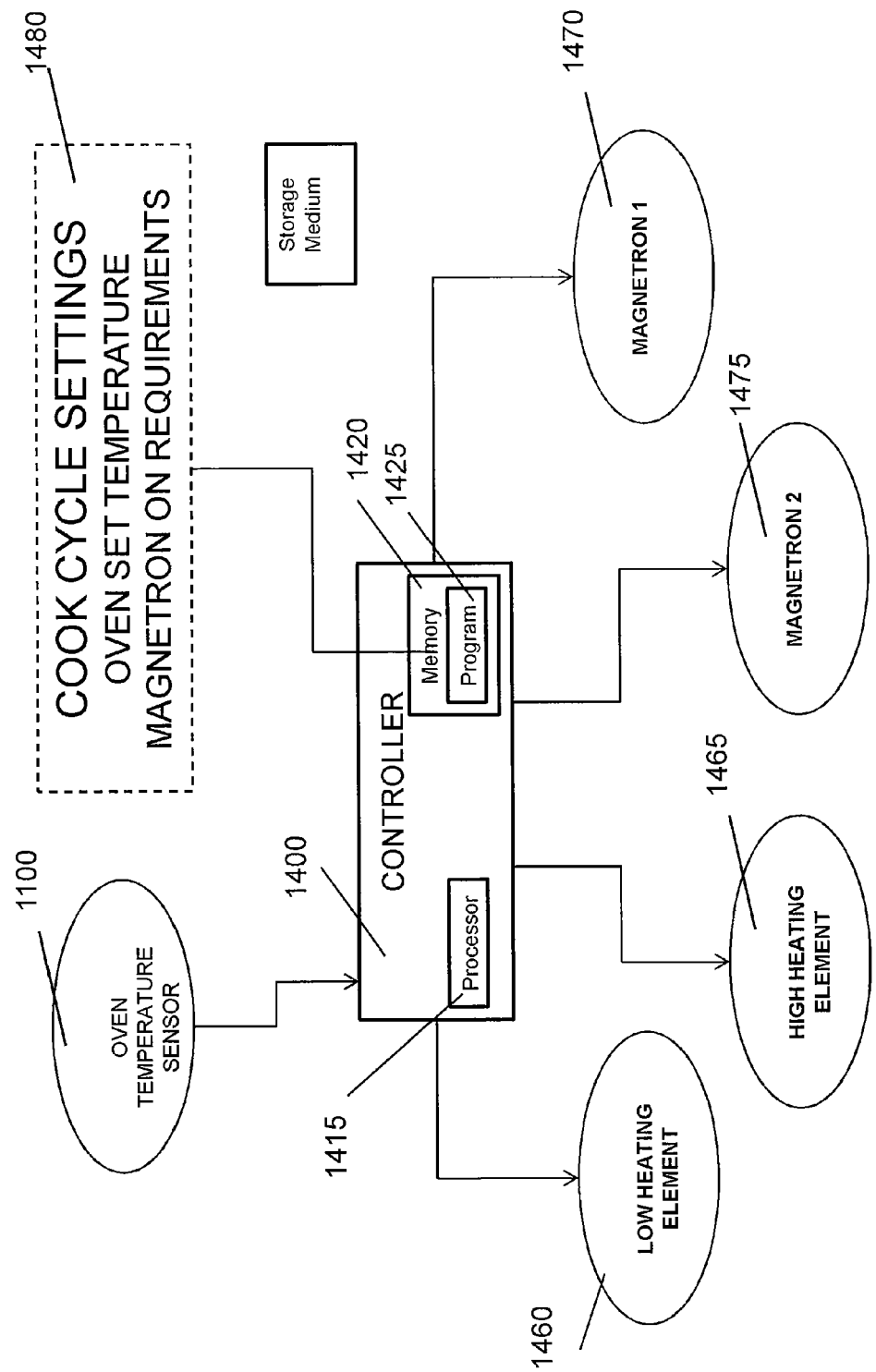
FIG. 14 is a block diagram depicting the controller used to maintain a 20 ampere draw by the oven according to yet another embodiment of the present disclosure.

FIG. 14 is a block diagram depicting a controller 1400 used to maintain a 20 ampere draw by the oven 100. Controller 1400 includes a computer that, in turn, includes a processor 1415 with an associated memory 1420. Controller 1400 is coupled to temperature sensor 1110, a low heating element 1460, a high heating element 1465, a first magnetron 1470, and a second magnetron 1475. Temperature sensor 1110 may be located within the air circulation and delivery system defined by the cooking chamber 101, the return air plenums 119, 120, the return air conduit 202 and the air inlet housing 111. Low heating element 1460 and high heating element 1465 are the first heating coil and the second heating coil of thermal energy source 165 that are operated independently so that the first heating coil may be activated while the second heating coil is deactivated and vice versa, or the first and second heating coils may each be activated together or not at all. Low heating element 1460 may be 1765 Watts at 208V e603 heater. High heating element 1465 may be 1950 Watts at 208V e603 heater. First magnetron 1470 and second magnetron 1475 are the pair of magnetrons (not shown), which are respectively positioned at the opposite upper corners of the cooking chamber 101 to launch microwave energies by waveguides (not shown) through launching horns 1004, 1006 having an antenna (not shown) therein, into the cooking chamber 101 through a ceramic partition separating each horn from cooking chamber 101.

Memory 1420 contains instructions for controlling operation of processor 1415. More specifically, memory 1420 contains a program module 1425 that contains instructions that when executed by processor 1415, cause processor 1415 to perform method 1500, described below. In this regard, controller 1400 activates and deactivates low heating element 1460, high heating element 1465, first magnetron 1470 and second magnetron 1475 to maintain a 20 ampere draw by the oven 100 based upon cook cycle settings, oven set temperature, and magnetron on requirements 1480 stored in memory 1420.

With regard to program module 1425, the term "module" is used herein to denote a functional operation that may be embodied either as a stand-alone component or as an integrated configuration of a plurality of sub-ordinate components.

Although controller 1400 is described herein as having program 1425 installed into memory 1420, program 1425 can be tangibly embodied on an external computer-readable storage medium 1485 for subsequent loading into memory 1420. Storage medium 1485 can be any storage medium, including, but not limited to, a floppy disk, a compact disk, a magnetic tape, a read only memory, or an optical storage medium. Program 1425 could also be embodied in a random access memory, or other type of electronic storage, located on a remote storage system and coupled to memory 1420.

Moreover, although program 1425 is described herein as being installed in memory 1420, and therefore being implemented in software, it could be implemented in any of hardware, firmware, software, or a combination thereof.

FIG. 15 is a logic diagram of the steps of a method 1500 used by the controller of FIG. 14 to maintain the 20 ampere or less draw by oven 100.

In step 1502, oven 100 is turned on. Temperature sensor 1100 detects a temperature, for example, in return air plenum 119. Temperature sensor 1100 outputs a signal to controller 1400 indicative of the temperature. In step 1504, controller 1400 determines whether the temperature is less than a set temperature that is predetermined and stored in memory 1420.

If the temperature is less than the set temperature, in step 1510, low heating element 1460 and high heating element 1465 are turned on by controller 1400, and method 1400 repeats step 1504.

If the temperature is greater than the set temperature, in step 1506, low heating element 1460 and high heating element 1465 are turned off by controller 1400, and, method 1500 proceeds to step 1508. In step 1508, controller 1400 detects whether a cooking cycle should be entered. A user of oven 100 may input a cooking cycle by a user interface (not shown), for example, via a touchscreen that outputs a signal, as is known in the art, to controller 1400 to enter the cooking cycle.

If controller 1400 does not detect an input to enter the cooking cycle in step 1508, method 1400 repeats step 1504.

If controller 1400 detects an input to enter the cooking cycle in step 1508, method 1400 enters the cooking cycle in step 1512. Controller 1400 operates oven 100 according to a process of the cook cycle stored in memory 1420 in step 1514, and proceeds to step 1516.

In step 1516, it is determined if the process of the cook cycle calls for both first magnetron 1470 and second magnetron 1475 to be on.

If the process of the cook cycle calls for both first magnetron 1470 and second magnetron 1475 to be on, first magnetron 1470 and second magnetron 1475 are turned on and low heating element 1460 and high heating element 1465 are turned off by controller 1400 in step 1518 for a predetermined time according to the process of the cook cycle, and method 1400 repeats step 1514.

If the process of the cook cycle does not call for both first magnetron 1470 and second magnetron 1475 to be on, it is determined if the process of the cook cycle calls for one of first magnetron 1470 and second magnetron 1475 to be on in step 1520.

If the process of the cook cycle calls for one of first magnetron 1470 and second magnetron 1475 to be on in step 1520, first magnetron 1470 and second magnetron 1475 alternate between first magnetron 1470 being on and second magnetron 1475 being off and first magnetron 1470 being off and second magnetron 1475 being on such that at no time does first magnetron 1470 operate while second magnetron 1475 is in operation and vice versa and high heating element 1465 is turned on by controller 1400 in step 1522 and method 1400 repeats step 1514.

If the process of the cook cycle does not call for one of first magnetron 1470 and second magnetron 1475 to be on in step 1520, low heating element 1460 and high heating element 1465 are turned on by controller 1400 and method 1400 repeats step 1514 until the process of the cook cycle is complete.

Accordingly, method 1500 used by controller 1400 maintains the 20 ampere or less draw by oven 100 during operation.

It should also be noted that the terms "first", "second", "third", "upper", "lower", "above", "below", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An oven which runs on a 20 ampere single phase electrical service, said oven comprising:
   a cooking chamber comprising a top wall, a bottom wall, a first side wall and a second side wall;
   at least one microwave generator that communicates microwave into said cooking chamber;
   a plurality of nozzles, tubes or apertures disposed above a food product disposed within said oven;
   at least one blower having an RPM in the range between about 3000 to about 4000, wherein said blower circulates at least a portion of gas through said nozzles, tubes or apertures into said cooking chamber substantially toward said food product and back to said nozzles, tubes or apertures, said gas exiting said cooking chamber through at least one of said first side wall and said second side wall into a plenum, said plenum increasing in size from a first side of said plenum toward a second side of said plenum along a length of said one of said first side wall and said second side wall; and a thermal energy source that heats said gas;

wherein said heated gas at or near said food product disposed in said cooking chamber exhibits a flow rate of at least about 150 CFM.

2. The oven according to claim 1, wherein said microwave generator comprises first and second magnetrons.

3. The oven according to claim 2, further comprising a controller which causes said first and second magnetrons to operate at separate times from one another, such that at no time does said first magnetron operate while said second magnetron is in operation and vice versa.

4. The oven according to claim 2, wherein said first and second magnetrons each have an amperage in the range between about 6.8 to 7.4 amperes.

5. The oven according to claim 2, further comprising a controller which causes said first and second magnetrons to operate at the same time without operating said thermal energy source.

6. The oven according to claim 1, further comprising at least one infrared heat element disposed beneath said food product.

7. The oven according to claim 6, further comprising a secondary source of heated air which is positioned to direct secondary heated air from near the bottom of said cooking chamber, such that said secondary heated air passes over or comes into contact with said infrared heating element.

8. The oven according to claim 6, wherein said infrared element has a wattage in the range between about 1200 Watts to about 1800 Watts.

9. The oven according to claim 1, wherein said oven exhibits a noise level when cooking said food product in the range between about 55.2 decibels to about 57.6 decibels.

10. The oven according to claim 1, wherein said blower has a RPM less than about 4000.

11. The oven according to claim 10, wherein said blower has an RPM of about 3,600.

12. The oven according to claim 1, wherein said thermal energy source has a wattage of between about 3600 Watts to about 4800 Watts.

13. An oven which runs on a 20 ampere single phase electrical service, said oven comprising:

a cooking chamber comprising a top wall, a bottom wall, a first side wall and a second side wall;

at least one microwave generator;

a plurality of nozzles, tubes or apertures disposed above a food product disposed within said oven;

at least one blower, wherein said blower circulates at least a portion of gas through said nozzles, tubes or apertures into said cooking chamber substantially toward said food product and back to said nozzles, tubes or apertures;

a thermal energy source that heats said gas; and a controller that at least partially activates or deactivates said microwave generator, said blower, and/or said thermal energy source such that said oven does not draw in excess of about 20 Amperes.

14. The oven according to claim 13, wherein said blower has an RPM in the range between about 3000 to about 4000, wherein said heated gas at or near said food product disposed in said cooking chamber exhibits a flow rate of at least about 150 CFM.

15. The oven according to claim 14, wherein said blower has a RPM less than about 4000.

16. The oven according to claim 15, wherein said blower has an RPM of about 3,600.

17. The oven according to claim 13, further comprising at least one temperature sensor disposed within the oven that detects a temperature therein and outputs a signal indicative of said temperature in said oven to said controller, and wherein said controller turns said thermal energy source on and off so the oven does not exceed 20 ampere single phase electrical service based upon said output.

18. The oven according to claim 13, wherein said microwave generator comprises first and second magnetrons.

19. The oven according to claim 18, further comprising a controller which causes said first and second magnetrons to operate at separate times from one another, such that at no time does said first magnetron operate while said second magnetron is in operation and vice versa.

20. The oven according to claim 18, wherein said first and second magnetrons each have an amperage in the range between about 6.8 to 7.4 amperes.

21. The oven according to claim 18, further comprising a controller which causes said first and second magnetrons to operate at the same time without operating said thermal energy source.

22. The oven according to claim 13, further comprising at least one infrared heat element disposed beneath said food product.

23. The oven according to claim 22, further comprising a secondary source of heated air which is positioned to direct secondary heated air from near the bottom of said cooking chamber, such that said secondary heated air passes over or comes into contact with said infrared heating element.

24. The oven according to claim 22, wherein said infrared element has a wattage in the range between about 1200 Watts to about 1800 Watts.

25. The oven according to claim 13, wherein said thermal energy source has a wattage of between about 3600 Watts to about 4800 Watts.

* * * * *